(12) United States Patent
Watanabe et al.

(10) Patent No.: US 11,331,742 B2
(45) Date of Patent: May 17, 2022

(54) FLUX-CORED WIRE, MANUFACTURING METHOD OF WELDED JOINT, AND WELDED JOINT

(71) Applicant: NIPPON STEEL & SUMITOMO METAL CORPORATION, Tokyo (JP)

(72) Inventors: Kotaro Watanabe, Tokyo (JP); Tatsuya Kumagai, Tokyo (JP); Hiroki Fujimoto, Tokyo (JP); Yasuhito Totsuka, Chiba (JP)

(73) Assignee: NIPPON STEEL CORPORATION, Tokyo (JP)

( * ) Notice: Subject to any disclaimer, the term of this patent is extended or adjusted under 35 U.S.C. 154(b) by 762 days.

(21) Appl. No.: 16/077,854

(22) PCT Filed: Mar. 8, 2016

(86) PCT No.: PCT/JP2016/057242
§ 371 (c)(1),
(2) Date: Aug. 14, 2018

(87) PCT Pub. No.: WO2017/154120
PCT Pub. Date: Sep. 14, 2017

(65) Prior Publication Data
US 2020/0070273 A1    Mar. 5, 2020

(51) Int. Cl.
*B23K 9/16* (2006.01)
*C22C 38/58* (2006.01)
(Continued)

(52) U.S. Cl.
CPC .............. *B23K 9/164* (2013.01); *B23K 9/235* (2013.01); *B23K 35/0266* (2013.01);
(Continued)

(58) Field of Classification Search
CPC ......... C22C 38/06; C22C 38/48; C22C 38/04; C22C 38/08; C22C 38/42; C22C 38/50;
(Continued)

(56) References Cited

U.S. PATENT DOCUMENTS 4,439,498 A * 3/1984 Sadowski .......... B23K 35/3066
219/136
2011/0114606 A1    5/2011 Suzuki
(Continued)

FOREIGN PATENT DOCUMENTS

CA    2 926 569 A1    5/2015
CN       1962147 A    5/2007
(Continued)

OTHER PUBLICATIONS

Korean Office Action dated Dec. 31, 2019 for counterpart Korean Application No. 10-2018-7024730, with English translation.
(Continued)

*Primary Examiner* — Dana Ross
*Assistant Examiner* — Kuangyue Chen
(74) *Attorney, Agent, or Firm* — Birch, Stewart, Kolasch & Birch, LLP

(57) ABSTRACT

According to an aspect of the present invention, there is provided a flux-cored wire including a steel sheath and a flux that fills the steel sheath. The flux contains fluorides of which a total value α of F-equivalent values is 0.21% or more, oxides of which the total value β of amounts ranges from 0.30% to less than 3.50%, and carbonates of which a total value of amounts ranges from 0% to 3.50%. An amount of CaO ranges from 0% to less than 0.20%. An amount of iron powder ranges from 0% to less than 10.0%. A X-value is 5.0% or less. The amount of $CaF_2$ is less than 0.50%. The amount of Ti oxides ranges from 0.10% to less than 2.50%. A ratio of α to β ranges from 0.10 to 4.00. A total value of
(Continued)

amounts of $MgCO_3$, $Na_2CO_3$, and $LiCO_3$ ranges from 0% to 3.00%. Other chemical composition is within a predetermined range. Ceq ranges from 0.45% to 1.20%.

18 Claims, 5 Drawing Sheets

(51) Int. Cl.
| | |
|---|---|
| C22C 38/54 | (2006.01) |
| C22C 38/50 | (2006.01) |
| C22C 38/48 | (2006.01) |
| C22C 38/46 | (2006.01) |
| C22C 38/44 | (2006.01) |
| C22C 38/42 | (2006.01) |
| C22C 38/06 | (2006.01) |
| C22C 38/02 | (2006.01) |
| C22C 38/00 | (2006.01) |
| B23K 35/02 | (2006.01) |
| B23K 35/30 | (2006.01) |
| B23K 35/362 | (2006.01) |
| B23K 9/235 | (2006.01) |
| B23K 9/23 | (2006.01) |

(52) U.S. Cl.
CPC ........ *B23K 35/3073* (2013.01); *B23K 35/362* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *B23K 9/23* (2013.01)

(58) Field of Classification Search
CPC ......... C22C 38/54; C22C 38/58; C22C 38/02; C22C 38/44; C22C 38/005; C22C 38/12; C22C 38/46; C22C 38/002; B23K 35/3073; B23K 35/3602; B23K 9/164; B23K 35/0266; B23K 35/362; B23K 35/3605; B23K 35/36; B23K 9/235; B23K 9/23; B23K 35/365; B23K 35/368; B23K 35/3053
See application file for complete search history.

(56) References Cited

U.S. PATENT DOCUMENTS

| | | | |
|---|---|---|---|
| 2011/0171485 A1* | 7/2011 | Kawamoto | ............ B23K 35/38 428/576 |
| 2012/0241433 A1 | 9/2012 | Kojima | |
| 2013/0037162 A1* | 2/2013 | Shinohara | ................ C21D 8/02 138/171 |
| 2015/0117937 A1 | 4/2015 | Nakamura et al. | |
| 2015/0360327 A1* | 12/2015 | Nakamura | ......... B23K 35/3066 403/272 |

FOREIGN PATENT DOCUMENTS

| | | |
|---|---|---|
| EP | 2871021 A1 | 5/2015 |
| JP | 1-271098 A | 10/1989 |
| JP | 3-294093 A | 12/1991 |
| JP | 6-155079 A | 6/1994 |
| JP | 8-197283 A | 8/1996 |
| JP | 8-257785 A | 10/1996 |
| JP | 2002-331384 A | 11/2002 |
| JP | 2007-90376 A | 4/2007 |
| JP | 2010-194595 A | 9/2010 |
| JP | 2013-18012 A | 1/2013 |
| JP | 2013-151001 A | 8/2013 |
| JP | 2014-14833 A | 1/2014 |
| JP | 2014-79807 A | 5/2014 |
| JP | 2015-6693 A | 1/2015 |
| JP | 2015-44236 A | 3/2015 |
| JP | 2015-83316 A | 4/2015 |
| JP | 2015-110247 A | 6/2015 |
| JP | 2016-83677 A | 5/2016 |
| KR | 10-2011-0055421 A | 5/2011 |
| WO | WO 2011/074689 A1 | 6/2011 |
| WO | WO 2013/168670 A1 | 11/2013 |
| WO | WO 2014/119082 A1 | 8/2014 |
| WO | WO 2015/068273 A1 | 5/2015 |
| WO | WO 2015/068443 A1 | 5/2015 |

OTHER PUBLICATIONS

Extended European Search Report for counterpart European Application No. 16893452.9, dated Oct. 2, 2019.
Chinese Office Action and Search Report for counterpart Chinese Application No. 201680083091.7, dated Mar. 4, 2020, with English translation.
International Search Report for PCT/JP2016/057242 dated Jun. 7, 2016.
Written Opinion of the International Searching Authority for PCT/JP2016/057242 (PCT/ISA/237) dated Jun. 7, 2016.

\* cited by examiner

FLUX-CORED WIRE, MANUFACTURING METHOD OF WELDED JOINT, AND WELDED JOINT

TECHNICAL FIELD OF THE INVENTION

The present invention relates to a flux-cored wire, a manufacturing method of a welded joint, and a welded joint. Particularly, the present invention relates to a flux-cored wire which is used when performing welding of a high-strength steel having tensile strength of 780 MPa or higher, in which preheating work for preventing a cold crack can be omitted or the preheating temperature during preheating work can be lowered, in which a weld metal having excellent low-temperature toughness can be obtained, and which can prevent generation of spatter.

RELATED ART

In recent years, needs for enlargement and high-rise of structure such as building, bridge, or the like increase. With this, high-strength steels of 780 MPa class or higher (tensile strength of 780 MPa or higher) are used as steel material for manufacturing the structure.

By using these high-strength steels as materials for the structure, it is possible to reduce the amount of steel material to obtain strength required for the structure. By reducing used amount of steel material, cost of steel material and cost for transporting steel material decrease, and weight of the structure decreases. By this, it is expected that construction period is shorter and cost for construction decreases, since it is easy to handle steel material and the amount of welding decreases.

However, even though needs for using high-strength steel significantly increase, the ratio of used amount of high-strength steel of 780 MPa or higher material with respect to total amount of steel material used in the structure is small.

The reason for this is that weld cracking sensitivity is high. Since it is necessary to perform preheating in order to prevent weld cracking, using high-strength steel decreases welding efficiency.

In addition, in a case where the structure is installed in low-temperature environment, extremely high low-temperature toughness is required for steel material and welding material used in the structure. The higher strength a steel material has, the more difficult it is to secure strength and low-temperature toughness of a weld. This is also the reason why high-strength steel of 780 MPa class is not used.

Accordingly, in order to widely use high-strength steel of 780 MPa class or higher, a welding wire which can omit preheating work or decrease preheating temperature during preheating work and by which a weld having excellent low-temperature toughness is obtained is strongly required.

As a flux-cored wire by which a weld metal having high toughness is obtained, a wire in which fluorides are added to a flux as a slag forming agent is proposed (for example, refer to Patent Documents 1 to 5).

These Patent Documents disclose that fluorides increases basicity of molten pool, and thereby the amount of oxygen of a weld metal decreases, and as a result, a weld having high low-temperature toughness is obtained. However, these Patent Documents 1 to 4 mainly intend to weld a steel sheet having strength level in which crack is less of an issue, and do not consider cold crack of the weld metal at all.

With respect to this, Patent Document 5 disclose that in a flux-cored wire for high tensile strength steel within 490 to 780 MPa class, addition amount of V is optimized and diffusion hydrogen is storage in V, and thereby cold-cracking resistance is improved. Thereby, Patent Document 5 proposes a wire in which preheating temperature for preventing weld crack is 50° C. or lower in spite of a wire of 780 MPa class. However, although higher toughness is required for a weld metal in welding of a steel of 780 MPa class or higher, Patent Document 5 does not consider toughness of a weld metal.

As a technology which drastically improves the above related arts, Patent Document 6 discloses a wire which has cold-cracking resistance when welding high strength steel having tensile strength of 780 MPa or higher without preheating, or which has cold-cracking resistance even in a case where preheating temperature is low when welding high strength steel having tensile strength of 780 MPa or higher. In gas shield arc welding, as shielding gas, it is desired to use 100% $CO_2$ gas of which cost is low. However, Patent Document 6 does not disclose example in which 100% $CO_2$ gas is used.

Patent Documents 7 to 9 disclose pulse gas shield arc welding using a flux-cored wire which contains $CaF_2$, other fluorides, and oxides, in which the ratio of the amount of fluorides and the amount of oxides is controlled to be within a predetermined range, and in which the amount of Ceq is controlled to be within a predetermined range. According to Patent Documents 7 to 9, a weld metal which prevents generation of ductility deterioration crack when welding high tensile strength steel having tensile strength of 950 MPa or higher and which has excellent breaking elongation is obtained.

Patent Document 10 discloses a metal-based flux-cored wire for gas shield arc welding, which contains a compound of at least one selected from the group consisting of oxides including one or at least two of alkali metals, fluorides, and carbonates, while a specific surface area is controlled to be within a predetermined range. According to Patent Document 10, there is provided a flux-cored wire having excellent weld penetration properties and favorable mechanical properties and welding workability of a weld metal.

Patent Document 11 discloses a flux-cored wire for gas shield arc welding, which contains $TiO_2$, alkali metal fluorides, and PTFE, in which the ratio of the amount of the alkali metal fluorides and the amount of the PTFE is controlled to be within a predetermined range, and in which the amount of alkaline earth metal fluorides is limited to a predetermined amount or smaller. According to Patent Document 11, there is provided a flux-cored wire in which diffusion hydrogen is prevented from entering a weld at the time of arc welding and which has excellent moisture absorption resistant properties and favorable welding workability.

Patent Document 12 discloses a flux-cored wire for gas shield arc welding for an anti-weathering steel, which includes Ti oxides, Si oxides, Al oxides, a Na compound, a K compound, and metal fluorides, while apparent density and the average grain diameter of the Al oxides are controlled to be within a predetermined range. According to Patent Document 12, there is provided a flux-cored wire which can obtain a weld metal having favorable welding workability in all-position welding and having excellent strength and toughness, when an anti-weathering steel is welded.

Patent Document 13 discloses a flux-cored wire for gas shield arc welding, which includes metal fluorides and $TiO_2$, and in which Mg content and Al content are controlled to be within a range defined by a predetermined expression. According to Patent Document 13, there is provided a flux-cored wire in which welding workability is favorable and by which a weld having excellent low-temperature toughness is obtained.

Patent Document 14 discloses a flux-cored wire for a high tensile strength steel within 490 to 780 MPa class in which V is contained in a sheath or a flux. According to Patent Document 14, there is provided a flux-cored wire in which cold-cracking resistance of a weld metal is improved.

Patent Document 15 discloses a flux-cored wire for gas shield arc welding, which contains metal fluorides, neutral oxides or basic oxides, one or two of Al and Mg, a deoxidizer, and a caking additive, while the amounts of C, Si, and Mn are within a predetermined range. According to Patent Document 15, there is provided a flux-cored wire which can obtain a weld metal having excellent welding workability and favorable low-temperature toughness.

Patent Document 16 discloses a flux-cored wire for gas shield arc welding of a high tensile strength steel, which includes $TiO_2$, $SiO_2$, $ZrO_2$, $Al_2O_3$, and fluorides, in which the amounts thereof are controlled to be within a range regulated by a predetermined mathematical expression, and in which the hydrogen content is limited to a predetermined amount or smaller. According to Patent Document 16, there is provided a flux-cored wire which can obtain a weld metal having excellent welding workability and excellent mechanical properties.

However, the flux-cored wires disclosed in Patent Documents 7 to 9 are required to contain large amount $CaF_2$. The flux-cored wires disclosed in Patent Documents 7 to 9 decrease welding workability since $CaF_2$ increases the amount of spatter.

The flux-cored wire according to Patent Document 10 is a metal-based wire in which a flux includes no slag forming agent. The welding slag which can be obtained by the slag forming agent has an effect of removing impurities from a molten pool, an effect of arranging a bead width and a bead wave and achieving favorable appearance of a weld metal, and an effect of preventing oxidation and nitriding of a weld metal immediately after solidification. However, according to the wire disclosed in Patent Document 10, the effects of welding slag cannot be obtained.

Patent Document 11 does not disclose a method of sufficiently decreasing the amount of diffusion hydrogen of a weld metal. Diffusion hydrogen of a weld metal which is obtained using example of the flux-cored wire disclosed in Patent Document 11 is at least 1.9 ml/100 g. According to knowledge of the present inventors, in a case where the amount of diffusion hydrogen of a weld metal is 1.9 ml/100 g or larger, it is difficult to omit preheating or lower preheating temperature without generation of cold-cracking. In addition, Patent Document 11 does not consider the amount of spatter when using 100% $CO_2$ gas as shielding gas, and does not disclose a way to reduce the amount of spatter.

Patent Document 12 does not disclose a way to improve cold-cracking resistance of a weld metal. The amount of fluorides disclosed in Patent Document 12 is not sufficient to decrease diffusion hydrogen of a weld metal.

The flux-cored wires disclosed in Patent Documents 13 and 14 are required to contain large amount $CaF_2$. The flux-cored wire disclosed in Patent Document 13 decreases welding workability since $CaF_2$ increases the amount of spatter.

Since the flux-cored wire disclosed in Patent Document 15 is filler metal for low-strength steel in which cold crack is unlikely to occur, Patent Document 15 does not consider improving cold-cracking resistance, and does not disclose a way of improving cold-cracking resistance.

The flux-cored wire disclosed in Patent Document 16 requires a large amount of $TiO_2$. Accordingly, in a case where the flux-cored wire disclosed in Patent Document 16 is used in welding in which 100% $CO_2$ gas is used as shielding gas, toughness of the obtained weld metal is low.

From those described above, it is required that a weld metal in which a cold crack is unlikely to be generated and which has excellent strength and toughness is formed by the gas shield arc welding, in manufacturing a welded joint of high strength steel of 780 MPa or higher. Moreover, even in a case where 100% $CO_2$ gas is used as a shielding gas, it is required that welding is performed while preventing the generation of spatter.

PRIOR ART DOCUMENT

Patent Documents

[Patent Document 1] Japanese Unexamined Patent Application, First Publication No. H01-271098
[Patent Document 2] Japanese Unexamined Patent Application, First Publication No. H03-294093
[Patent Document 3] Japanese Unexamined Patent Application, First Publication No. H06-155079
[Patent Document 4] Japanese Unexamined Patent Application, First Publication No. H08-197283
[Patent Document 5] Japanese Unexamined Patent Application, First Publication No. H08-257785
[Patent Document 6] International publication No. 2014/119082
[Patent Document 7] Japanese Unexamined Patent Application, First Publication No. 2014-14833
[Patent Document 8] Japanese Unexamined Patent Application, First Publication No. 2014-79807
[Patent Document 9] International publication No. 2013/168670
[Patent Document 10] Japanese Unexamined Patent Application, First Publication No. 2002-331384
[Patent Document 11] Japanese Unexamined Patent Application, First Publication No. 2007-90376
[Patent Document 12] Japanese Unexamined Patent Application, First Publication No. 2013-151001
[Patent Document 13] Japanese Unexamined Patent Application, First Publication No. H06-155079
[Patent Document 14] Japanese Unexamined Patent Application, First Publication No. H08-257785
[Patent Document 15] Japanese Unexamined Patent Application, First Publication No. H01-271098
[Patent Document 16] Japanese Unexamined Patent Application, First Publication No. 2013-18012

DISCLOSURE OF THE INVENTION

Problems to be Solved by the Invention

An object of the present invention is to provide a flux-cored wire which has high strength and high toughness, in which a weld having excellent cold-cracking resistance can be obtained, and in which a generation amount of spatter during welding can be drastically reduced.

In addition, another object of the present invention is to provide a manufacturing method of a welded joint, in which preheating work for preventing a cold crack can be omitted or a preheating temperature during preheating work can be lowered, and a generation amount of spatter can be drastically reduced.

Moreover, further another object of the present invention is to provide a welded joint which has high strength and high toughness.

Means for Solving the Problem

The summary of the present invention is as follows.

(1) A flux-cored wire according to an aspect of the present invention includes: a steel sheath; and a flux that fills the steel sheath, wherein the flux contains: fluorides which include one or at least two selected from the group consisting of $CaF_2$, $MgF_2$, $Na_3AlF_6$, $LiF$, $NaF$, $K_2ZrF_6$, $BaF_2$, and $K_2SiF_6$, and of which a total value α of F-equivalent values is 0.21% or more with respect to a total mass of the flux-cored wire; oxides which include one or at least two selected from the group consisting of Fe oxides, Ba oxides, Na oxides, Ti oxides, Si oxides, Zr oxides, Mg oxides, Al oxides, Mn oxides, and K oxides, while excluding CaO, and of which a total value β of amounts ranges from 0.30% to less than 3.50% by mass % with respect to the total mass of the flux-cored wire; and carbonates which include one or at least two selected from the group consisting of $MgCO_3$, $Na_2CO_3$, $LiCO_3$, $CaCO_3$, $K_2CO_3$, $BaCO_3$, $FeCO_3$ and $MnCO_3$, and of which a total value of amounts ranges from 0% to 3.50% by mass % with respect to the total mass of the flux-cored wire, wherein an amount of the CaO in the flux ranges from 0% to less than 0.20% by mass % with respect to the total mass of the flux-cored wire, wherein an amount of iron powder in the flux ranges from 0% to less than 10.0% by mass % with respect to the total mass of the flux-cored wire, wherein a X-value calculated by using Expression 1 is 5.0% or less, wherein the amount of the $CaF_2$ is less than 0.50% by mass % with respect to the total mass of the flux-cored wire, wherein the amount of the Ti oxides ranges from 0.10% to less than 2.50% by mass % with respect to the total mass of the flux-cored wire, wherein a total value of the amounts of the $MgCO_3$, the $Na_2CO_3$, and the $LiCO_3$ ranges from 0% to 3.00% by mass % with respect to the total mass of the flux-cored wire, wherein a chemical composition excluding the fluorides, the oxides, the CaO, the carbonates, and the iron powder includes, by mass % with respect to the total mass of the flux-cored wire, C: 0.003% to 0.200%, Si: 0.20% to 1.50%, Mn: 1.00% to 3.50%, Mg: 0.10% or less, P: 0.020% or less, S: 0.020% or less, Al: 0.001% to 0.300%, Ni: 0.50% to 4.00%, Mo: 0.10% to 2.00%, Cu: 0% to 0.50%, Cr: 0% to 1.50%, Nb: 0% to 0.10%, V: 0% to 0.40%, Ti: 0% to 0.30%, B: 0% to 0.0100%, Bi: 0% to 0.0100%, Ca: 0% to 0.50%, and REM: 0% to 0.0100%, while having a remainder composed of iron and impurities, and wherein Ceq calculated by using the following Expression 2 ranges from 0.45% to 1.20%, $$X=[NaF]+[MgF_2]+[Na_3AlF_6]+1.50\times([K_2SiF_6]+[K_2ZrF_6]+[LiF]+[BaF_2])+3.50\times([CaF_2]): \quad \text{Expression 1}$$

where, the chemical formulas with square brackets each indicate, by unit mass % with respect to the total mass of the flux-cored wire, the amount of the fluoride corresponding to each of the chemical formulas, $$Ceq=[C]+[Si]/24+[Mn]/6+[Ni]/40+[Cr]/5+[Mo]/4+[V]/14: \quad \text{Expression 2}$$

where, the element symbols with square brackets each express, by unit mass % with respect to the total mass of the flux-cored wire, the amount of the element corresponding to each of the element symbols included in the chemical composition excluding the fluorides, the oxides, the CaO, the carbonates, and the iron powder.

(2) In the flux-cored wire according to (1), the chemical composition excluding the fluorides, the oxides, the CaO, the carbonates, and the iron powder may include, by mass % with respect to the total mass of the flux-cored wire, Mg: 0.07% or less.

(3) In the flux-cored wire according to (1) or (2), the chemical composition excluding the fluorides, the oxides, the CaO, the carbonates, and the iron powder may satisfy Expression 3, $$([Mg]+10\times[Al])\le 0.45: \quad \text{Expression 3}$$

where, the element symbols with square brackets each indicate, by unit mass % with respect to the total mass of the flux-cored wire, the amount of the element corresponding to each of the element symbols included in the chemical composition excluding the fluorides, the oxides, the CaO, the carbonates, and the iron powder.

(4) In the flux-cored wire according to any one of (1) to (3), the total amount of the carbonates may range from more than 0.30% to 3.50% by mass % with respect to the total mass of the flux-cored wire, and the total amount of the $MgCO_3$, the $Na_2CO_3$, and the $LiCO_3$ may range from 0.30% to 3.00% by mass % with respect to the total mass of the flux-cored wire.

(5) In the flux-cored wire according to any one of (1) to (4), the α may be 0.50% or more.

(6) In the flux-cored wire according to any one of (1) to (5), the X-value may be 4.5% or less.

(7) In the flux-cored wire according to any one of (1) to (6), the amount of the Ti oxides may range from 0.10% to 1.80% by mass % with respect to the total mass of the flux-cored wire.

(8) In the flux-cored wire according to any one of (1) to (7), the amount of the $CaF_2$ may be 0.20% or less by mass % with respect to the total mass of the flux-cored wire.

(9) In the flux-cored wire according to any one of (1) to (8), α/β may range from 0.10 to 4.00.

(10) In the flux-cored wire according to any one of (1) to (9), the total amount of $Na_3AlF_6$ and NaF by mass % with respect to the total mass of the flux-cored wire may be 50% or more of the total amount of the fluorides by mass % with respect to the total mass of the flux-cored wire.

(11) In the flux-cored wire according to any one of (1) to (10), tensile strength of a deposited metal which is formed by a gas shield arc welding using the flux-cored wire may range from 690 MPa to less than 1500 MPa in a tensile test of the deposited metal, the tensile test being regulated by JIS Z 3111-2005.

(12) In the flux-cored wire according to any one of (1) to (11), the steel sheath may have a seamless shape.

(13) In the flux-cored wire according to any one of (1) to (11), the steel sheath may have a slit-shaped gap.

(14) The flux-cored wire according to any one of (1) to (13), may further include: perfluoropolyether oil that coats a surface of the flux-cored wire.

(15) A manufacturing method of a welded joint according to another aspect of the present invention includes: performing gas shield arc welding of a steel material by using the flux-cored wire according to any one of (1) to (14).

(16) In the manufacturing method of a welded joint according to (15), the steel material may be one selected from the group consisting of: a steel sheet in which a sheet thickness is 12 mm or less and Pcm is 0.36% or less; a steel sheet in which a sheet thickness is more than 12 mm to 25 mm and Pcm is 0.33% or less; a steel sheet in which a sheet thickness is more than 25 mm to 40 mm and Pcm is 0.31% or less; and a steel sheet in which a sheet thickness is more than 40 mm to 100 mm and Pcm is 0.29% or less, and wherein the gas shield arc welding may be performed after the steel material is preheated such that the temperature of the steel material becomes 5° C. or higher in a case where the temperature of the steel material is less than 5° C. when the steel material is subjected to the gas shield arc welding; or the gas shield arc welding may be performed without preheating the steel material in a case where the temperature of the steel material is 5° C. or higher when the steel material is subjected to the gas shield arc welding, where Pcm is calculated by using the following Expression 4, $$Pcm=[C]+[Si]/30+[Mn]/20+[Cu]/20+[Ni]/60+[Cr]/20+[Mo]/15+[V]/10+5\times[B]:\quad \text{Expression 4}$$

where, the element symbols with square brackets each express, by unit mass %, the amount of the element corresponding to each of the element symbols included in the steel material.

(17) A welded joint according to another aspect of the present invention is obtained by the manufacturing method of a welded joint according to (15) or (16).

(18) A flux-cored wire according to another aspect of the present invention includes: a steel sheath; and a flux that fills an inside of the steel sheath, wherein an amount of diffusion hydrogen of a weld metal, which is obtained by performing direct current gas shield arc welding using the flux-cored wire under a condition regulated by JIS Z 3118, is 1.0 ml/100 g or smaller, and wherein a weight per welding time of a spatter, which is generated when direct current gas shield arc welding is performed by using the flux-cored wire under conditions that wire polarity is positive, a current value is 270 A, a voltage value ranges from 29 to 32 V, a welding rate is 30 cm/min, a type of a shielding gas is 100% $CO_2$ gas, and a flow rate of the shielding gas is 25 L/min, is 5.0 g/min or smaller.

(19) A flux-cored wire according to another aspect of the present invention includes: a steel sheath; and a flux that fills an inside of the steel sheath, wherein the flux-cored wire has an amount of Ti oxides ranging from 0.10% to 2.50% by mass % with respect to a total mass of the flux-cored wire and includes Ni: 0.5% to 4.00%, wherein an amount of diffusion hydrogen of a weld metal, which is obtained by performing direct current gas shield arc welding using the flux-cored wire under a condition regulated by JIS Z 3118, is 1.0 ml/100 g or smaller, and wherein a weight per welding time of a spatter, which is generated when direct current gas shield arc welding is performed by using the flux-cored wire under conditions that wire polarity is positive, a current value is 270 A, a voltage value ranges from 29 to 32 V, a welding rate is 30 cm/min, a type of a shielding gas is 100% $CO_2$ gas, and a flow rate of the shielding gas is 25 L/min, is 5.0 g/min or smaller.

Effects of the Invention

In the flux-cored wire according to the above embodiment and the welding method according to the present invention, a weld having high strength and high toughness is obtained, the generation amount of spatter during welding can be drastically reduced, preheating for preventing cold crack can be omitted or a preheating temperature during preheating work can be lowered.

The welded joint according to the present invention includes a weld having high strength and high toughness.

The flux-cored wire and the manufacturing method of a welded joint according to the present invention can be applied to any steel material. Particularly, remarkable effects are exhibited in a case of being applied to welding of a high strength steel of 780 MPa or higher to which it is difficult for an ordinary flux-cored wire and a manufacturing method of a welded joint to be applied. Even in this case, according to the present invention, preheating work for preventing a cold crack can be omitted or the preheating temperature during preheating work can be lowered. Moreover, the flux-cored wire and the manufacturing method of a welded joint according to the present invention can be combined with any shielding gas. Particularly, remarkable effects are exhibited in a case of being combined with 100% $CO_2$ gas with which it is difficult for an ordinary flux-cored wire and an ordinary manufacturing method of a welded joint to be combined. Even in this case, according to the present invention, the amount of a spatter can be drastically decreased.

EMBODIMENTS OF THE INVENTION

The factors causing a cold crack in a HAZ at the time of welding are hardness of the HAZ, an amount of diffusion hydrogen in a weld metal, and the like. The inventors have studied various methods for reliably preventing a cold crack in the HAZ. As a result, it has become clear that a cold crack in the HAZ can be prevented if hydrogen can be prevented from invading the HAZ by sufficiently reducing the amount of diffusion hydrogen in a weld metal, even in a case where hardness of the HAZ is remarkably high.

However, according to the technologies in the related art, it has been difficult to sufficiently reduce the amount of diffusion hydrogen in a weld metal immediately after welding. The inventors have repeatedly studied to sufficiently reduce the amount of diffusion hydrogen in a weld metal immediately after welding, using flux-cored wires differing in type and compounding ratio of the flux component.

As a result, the inventors have ascertained that the amount of diffusion hydrogen of a weld metal is controlled to be smaller than 1.0 ml/100 g and cold-cracking resistance is drastically improved in a case where total value of F-equivalent values of amounts of fluorides is within a specified range. In addition, the inventors have ascertained that it is possible to further reduce the amount of diffusion hydrogen by including carbonates in a flux and controlling the CaO content and the Mg content.

However, there are cases where fluorides included in the flux increases the amount of spatter. Particularly, in a case where a flux-cored wire containing a lot of fluorides is applied to welding with a shielding gas of 100% $CO_2$ gas, sometimes the amount of spatter extremely increases. The inventors have repeatedly studied to control the amount of spatter, using flux wires differing in type of fluorides to be included in the flux.

As a result, the inventors have found that there is a favorable correlationship between an F-equivalent value of the amount of fluorides and the amount of diffusion hydrogen in a weld metal immediately after welding, and there is a favorable correlationship between a spatter generation index X calculated by using the following expression and the generation amount of spatter.

$$X=[NaF]+[MgF_2]+[Na_3AlF_6]+1.50\times([K_2SiF_6]+[K_2ZrF_6]+[LiF]+[BaF_2])+3.5\times[CaF_2]$$

Figure 1:
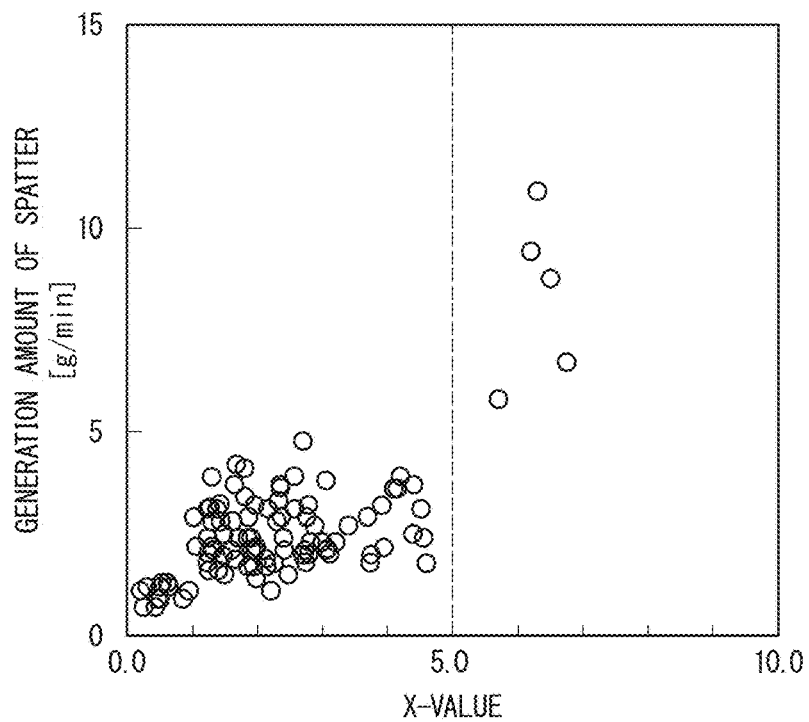
FIG. 1 is a view illustrating a relationship between a X-value of a flux-cored wire and an amount of spatter during welding using the flux-cored wire.

In the expression described above, the bracketed chemical formulas each indicate, by unit mass % with respect to the total mass of the flux-cored wire, the amount of the fluoride corresponding to each of the chemical formulas. The expression described above is obtained by measuring the amount of spatter generated when the flux-cored wires differing in the amount of each fluoride is subjected to welding with a shielding gas of 100% $CO_2$, and performing multiple regression analysis of a relationship between the amount of each fluoride and the amount of spatter. FIG. 1 is a graph illustrating a relationship between a X-value and the amount of spatter. From this graph, it is possible to know that there is a favorable correlationship between the X-value and the amount of spatter. Therefore, if the type and the compounding ratio of fluorides included in the flux are determined such that the F-equivalent value of fluorides included in the flux is increased as much as possible and the X-value calculated from the fluorides included in the flux is reduced as much as possible, it is possible to provide a flux-cored wire in which the amount of diffusion hydrogen in a weld metal immediately after welding is smaller than 1.0 ml/100 g without harming workability of welding with a shielding gas of 100% $CO_2$ gas.

In addition, the inventors have also found that it is necessary to control the content of $CaF_2$ among fluorides in order to reduce the amount of spatter.

The present invention has been made based on the above studies. Hereinafter, the flux-cored wire according to the present embodiment will be described.

The flux-cored wire according to the present embodiment includes a steel sheath and a flux that fills the inside of the steel sheath. First, the flux component will be described. The flux of the flux-cored wire according to the present embodiment includes fluorides, and oxides excluding CaO. Preferably, the flux further includes carbonates. In addition, CaO and iron powder may be further included in the flux of the flux-cored wire according to the present embodiment. However, CaO and iron powder are not necessary to achieve the object of the flux-cored wire according to the present embodiment. Particularly, if CaO comes into contact with the air, CaO changes into CaOH which is a compound including hydrogen, thereby increasing the amount of diffusion hydrogen of a weld metal. Therefore, it is preferable that CaO is not included.

Hereinafter, these components will be described in detail. In description below, unless otherwise described particularly, "%" denotes "mass % with respect to the total mass of the flux-cored wire".

(Total of F-Equivalent Values of Fluorides with Respect to Total Mass of Flux-Cored Wire: 0.21% or More)

The flux of the flux-cored wire according to the present embodiment includes fluorides of 0.21% or more in total in terms of the F-equivalent value with respect to the total mass of the flux-cored wire. The F-equivalent value with respect to the total mass of the flux-cored wire indicates, by mass % with respect to the total mass of the flux-cored wire, the amount of fluorine (F) included in fluorides in the flux-cored wire. As described below, fluorides of the flux-cored wire according to the present embodiment are at least one selected from the group consisting of $CaF_2$, $MgF_2$, $Na_3AlF_6$, LiF, NaF, $K_2ZrF_6$, $BaF_2$, and $K_2SiF_6$, and the total of the F-equivalent values with respect to the total mass of the flux-cored wire is obtained in terms of the following mathematical expression.

$$\text{(Total of F-equivalent values)}=0.487\times[CaF_2]+0.610\times[MgF_2]+0.732\times[LiF]+0.452\times[NaF]+0.402\times[K_2ZrF_6]+0.217\times[BaF_2]+0.517\times[K_2SiF_6]+0.543\times[Na_3AlF_6]$$

In the expression described above, the bracketed chemical formulas each indicate, by mass % with respect to the total mass of the flux-cored wire, the amount of the fluoride corresponding to each of the chemical formulas. Hereinafter, there are cases where "the F-equivalent value with respect to the total mass of the flux-cored wire" is disclosed as "the F-equivalent value". In addition, the reference sign "a" is defined as the total of the F-equivalent values of fluorides with respect to the total mass of the flux-cored wire.

The coefficient of the F-equivalent value of each of the fluorides is calculated from the atomic weight and the number of fluorine included in each fluoride, and the chemical formula weight of each fluoride. For example, the coefficient 0.487 of the F-equivalent value of $CaF_2$ is a value obtained by dividing the value, which is twice the atomic weight 19.00 of fluorine, by the chemical formula weight 78.08 of $CaF_2$ (that is, $19.00 \times 2/78.08=0.487$).

The fluorides in the flux function to reduce the amount of diffusion hydrogen of a weld metal and to remarkably improve cold-cracking resistance of a weld metal. Although the reason thereof is not clear, it is assumed that F and hydrogen (H) in fluorides are bonded together during welding and become hydrogen fluoride (HF), and the HF is released to the outside of the weld metal. However, in a case where the total of the F-equivalent values of amounts of fluorides in the flux is less than 0.21%, the amount of diffusion hydrogen of a weld metal may not be smaller than 1.0 ml/100 g. Therefore, cold-cracking resistance of the weld metal is likely to become insufficient. Therefore, the flux of the flux-cored wire according to the present embodiment is required to include fluorides of 0.21% or more in terms of the F-equivalent value. In order to further reduce the amount of diffusion hydrogen of a weld metal, the lower limit for the total amount of the F-equivalent value of fluorides may be set to 0.25%, 0.30%, 0.35%, 0.40%, 0.45%, 0.50%, 0.60%, 0.65%, 0.70%, 0.80%, or 0.90%. Meanwhile, in a case of intending to give priority to reduction of the generation amount of spatter over reduction of the amount of diffusion hydrogen, the upper limit for the total amount of the F-equivalent value may be set to 2.00%, 1.70%, 1.50%, 1.30%, 1.10%, 1.00%, 0.90%, 0.80%, 0.70%, 0.60%, 0.50%, or 0.40%.

An experiment in which the inventors have obtained the above-described knowledge will be described below. The various flux wires differing in the total of the F-equivalent values as described above are subjected to welding under the following conditions, and the amount of diffusion hydrogen of a weld metal obtained through the welding is measured by a method in conformity to JIS Z 3118: 2007 "method of measurement of amount of hydrogen evolved from steel welds".

Figure 2:
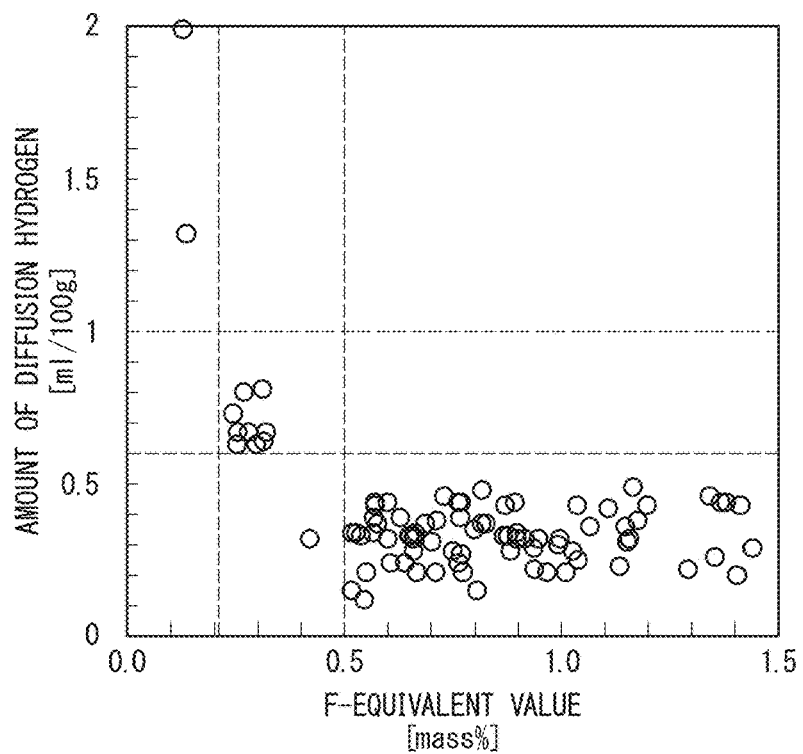
FIG. 2 is a view illustrating a relationship between an F-equivalent value of a flux-cored wire and the amount of diffusion hydrogen of a weld metal obtained by using the flux-cored wire.

Wire diameter: 1.2 mm
Type of welding gas: 100% $CO_2$
Gas flow rate: 25 L/min
Welding current: 270 A
Welding rate: 35 cm/min
Temperature of welding environment: 20° C.
Humidity of welding environment: 60%
Posture: downward
Polarity: wire+ (positive)
Current: direct current The graph of FIG. 2 illustrates the relationship between the total of the F-equivalent values of the flux-cored wire and the amount of diffusion hydrogen of a weld metal obtained from the experiment described above. From this graph, it is ascertained that in a case where the total of the F-equivalent values of the flux-cored wire is 0.21% or more, the amount of diffusion hydrogen is reduced to 1.0 ml/100 g or smaller. In addition, from this graph, it is ascertained that in a case where the total of the F-equivalent values of the flux-cored wire is 0.50% or more, the amount of diffusion hydrogen is reduced to 0.6 ml/100 g or smaller.

In a case where the amount of fluorides is excessive, the amount of spatter during welding increases. However, in the flux-cored wire according to the present embodiment, there is no need to set an upper limit value for the F-equivalent value of fluorides because the inventors have found that the upper limit value for the amount of fluorides has to be restricted by using the spatter generation index X, which will be described below. The F-equivalent value of fluorides can be selected such that the spatter generation index X is within the range described below.

(Types of Fluorides: One or at Least Two Selected from Group Consisting of $CaF_2$, $MgF_2$, $Na_3AlF_6$, LiF, NaF, $K_2ZrF_6$, $BaF_2$, and $K_2SiF_6$)

Fluorides of the flux-cored wire according to the present embodiment are one or at least two selected from the group consisting of $CaF_2$, $MgF_2$, $Na_3AlF_6$, LiF, NaF, $K_2ZrF_6$, $BaF_2$, and $K_2SiF_6$. Ca, Mg, Li, Na, K, Zr, Ba, Si, and Al generated after ionization of the fluorides are bonded with oxygen and act as deoxidizing elements reducing the oxygen content in the weld metal.

(X-Value of Fluorides: 5.0% or Less)

In a case where the amount of fluorides is excessively large, the amount of spatter generated at the time of welding becomes excessive, so that weldability deteriorates. The inventors increased the F-equivalent value as much as possible and studied the method of reducing the amount of spatter to the permissible range. As a result, the inventors have ascertained that the influence of fluorides to the amount of spatter varies depending on the type of fluorides. Then, the inventors have further studied and eventually found that there is a favorable correlationship between the spatter generation index X (X-value) calculated by the following expression and the amount of spatter.

$$X=[NaF]+[MgF_2]+[Na_3AlF_6]+1.50\times([K_2SiF_6]+[K_2ZrF_6]+[LiF]+[BaF_2])+3.50\times([CaF_2])$$

In the expression described above, the bracketed chemical formulas each indicate, by unit mass % with respect to the total mass of the flux-cored wire, the amount of the fluoride corresponding to each of the chemical formulas. The above-described expression is obtained by measuring the amount of spatter generated when the various flux-cored wires differing in the amount of fluorides are subjected to welding with a shielding gas of 100% $CO_2$, and performing multiple regression analysis of the relationship between the amount of each fluoride and the amount of spatter.

An experiment in which the inventors have obtained the above-described knowledge regarding the X-value will be described below. The various flux wires differing in the total of the X-values as described above are subjected to welding under the following conditions.

Wire diameter: 1.2 mm
Type of welding gas: 100% $CO_2$ gas
Flow rate of welding gas: 25 L/min
Welding current: 270 A
Welding voltage: 29 to 32V
Welding rate: 30 cm/min
Welding posture: downward
Welding time: 60 seconds
Polarity: wire+ (positive)
Current: direct current Welding is carried out inside a copper spatter scavenging case under the above-described conditions. Spatters generated during the welding (spatters which are adhered to the copper spatter scavenging case and a steel sheet after welding) are scavenged, and weight of the scavenged spatters is measured. In this experiment, total weight of all spatters generated during the welding is measured.

The graph of FIG. 2 illustrates the relationship between the X-value of the flux-cored wire and the generation amount of spatter per minute, which is obtained from the experiment described above. From this graph, it is ascertained that in a case where the X-value of the flux-cored wire is 5.0% or less, the generation amount of spatter per minute is reduced. Based on this experimental result, the inventors have set the upper limit value for the X-value of the flux-cored wire according to the present embodiment to 5.0%. In the flux-cored wire according to the present embodiment, there is a need to control the amount and the type of fluorides such that the X-value satisfies the above-described conditions. A preferable upper limit value for the X-value is 4.5%. In a case of intending to reduce the generation amount of spatter, the upper limit value for the X-value may be set to 4.0%, 3.5%, 3.0%, 2.5%, 2.0%, 1.8%, 1.6%, 1.4%, 1.2%, or 1.0%.

There is no need to limit the lower limit value for the X-value. However, since the total of the F-equivalent values is required to be set to 0.21% or more, the minimum value of the X-value which can satisfy the regulation on the F-equivalent value may be set as the lower limit value for the X-value. Specifically, the X-value is minimized in a case where the total of the F-equivalent values is the lowest value (0.21%) and fluorides consist of only $MgF_2$. In the case where only $MgF_2$ is contained as the fluorides, the minimum requirement for $MgF_2$ is 0.344% (=0.21/0.610). Therefore, there is no possibility that the lower limit value for the X-value falls below 0.344%. Therefore, the lower limit value for the X-value may be set to 0.344%. In a case where the amount of diffusion hydrogen is to be further reduced, the lower limit value for the X-value may be set to 0.40%, 0.60%, 0.80%, 1.00%, 1.20%, 1.40%, 1.60%, or 1.80%.

(Amount of $CaF_2$ by Mass % with Respect to Total Mass of Flux-Cored Wire: Less than 0.50%)

Figure 3:
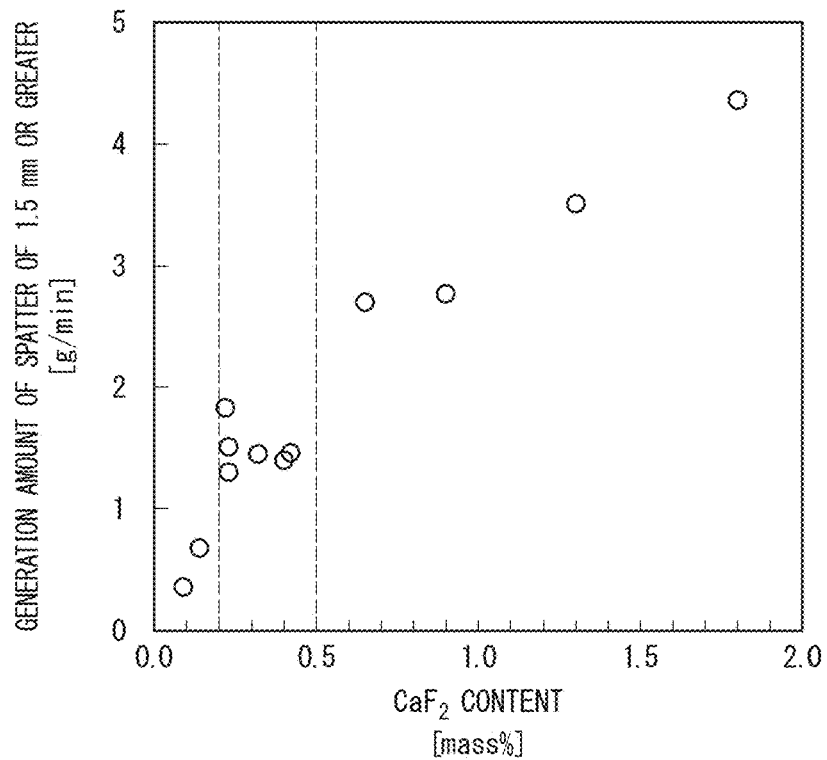
FIG. 3 is a view illustrating a relationship between a $CaF_2$ content of a flux-cored wire and the amount of spatter during welding using the flux-cored wire.

$CaF_2$ is fluoride which is likely to particularly increase the amount of spatter. The inventors have ascertained that even if the X-value of fluoride is 2.0% or less, $CaF_2$ of 0.50% or more by mass % with respect to total mass of flux-cored wire generates a large amount of spatters so that welding workability deteriorates. An experiment in which the inventors have obtained the above-described knowledge regarding the amount of $CaF_2$ will be described. Various flux wires differing in the amount of $CaF_2$ and having the X-value within the regulation range described above are subjected to welding under the same conditions as those when the graph of FIG. 1 is made. Then, the generation amount of spatter having diameter of 1.5 mm or larger per minute is obtained by the same method as that when the graph of FIG. 1 is made. In this experiment, spatters generated during the welding are sieved to separate spatter having diameter of 1.5 mm or larger, and total weight of spatters of 1.5 mm or larger is measured. The graph of FIG. 3 illustrates the relationship between the amount of $CaF_2$ and the generation amount of spatter having diameter of 1.5 mm or greater per minute, which is obtained in this experiment. From this graph, it is ascertained that in a case where the $CaF_2$ content is 0.5% or more, the generation amount of spatter increases. Meanwhile, from this graph, it is ascertained that in a case where the $CaF_2$ content is 0.2% or less, the generation amount of spatter having diameter of 1.5 mm or larger further decreases. Therefore, the amount of $CaF_2$ in the flux-cored wire according to the present embodiment is set to be less than 0.50%. A more preferable upper limit value for the amount of $CaF_2$ is 0.20%. As necessary, the amount of $CaF_2$ may be set to be less than 0.10%, less than 0.06%, less than 0.04%, or less than 0.02%.

As long as the above-described conditions related to the F-equivalent value and the X-value are satisfied, there is no need to individually regulate the amounts of fluorides other than $CaF_2$. However, it is preferable that the total amount of $Na_3AlF_6$ and NaF by unit mass % with respect to the total mass of the wire is 50% or more of the total amount of fluorides by unit mass % with respect to the total mass of the wire. Hereinafter, the ratio of the total amount of $Na_3AlF_6$ and NaF by unit mass % with respect to the total mass of the wire to the total amount of fluorides by unit mass % with respect to the total mass of the wire will be referred to as the ratio of $Na_3AlF_6$+NaF.

Figure 4:
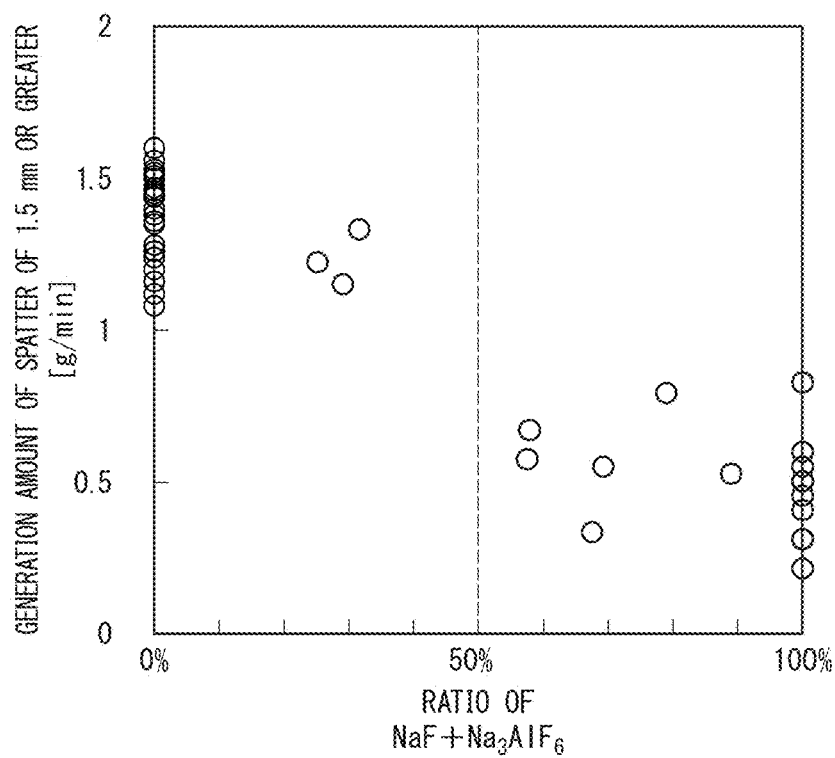
FIG. 4 is a view illustrating a relationship between a ratio of $NaF+Na_3AlF_6$ of a flux-cored wire and the amount of spatter during welding using the flux-cored wire.

An experiment in which the inventors have obtained the above-described knowledge will be described below. The inventors have obtained the generation amount of spatter having diameter of 1.5 mm or greater per minute by performing welding of various flux wires differing in the ratio of $Na_3AlF_6$+NaF under the same conditions as those when the graph of FIG. 3 is made, and by using the same method as that when the graph of FIG. 3 is made. The graph of FIG. 4 illustrates the relationship between the ratio of $Na_3AlF_6$+NaF and the generation amount of spatter having diameter of 1.5 mm or larger per minute, which is obtained in this experiment. From this graph, it is ascertained that in a case where the ratio of $Na_3AlF_6$+NaF is 50% or more, the generation amount of spatter having diameter of 1.5 mm or larger is reduced. Therefore, in the flux-cored wire according to the present embodiment, it is preferable that the ratio of $Na_3AlF_6$+NaF is 50% or more. As necessary, the ratio of $Na_3AlF_6$+NaF may be set to 60% or more, 80% or more, 90% or more, or 100%. In addition, in place of the ratio of $Na_3AlF_6$+NaF, in a calculation expression of a spatter generation index X, the ratio of the total amount of $Na_3AlF_6$, NaF, and $MgF_2$ (ratio of $Na_3AlF_6$+NaF+$MgF_2$) having a coefficient of 1, by unit mass % with respect to the total mass of the wire, to the total amount of fluorides by unit mass % with respect to the total mass of the wire may be set to 50% or more, 60% or more, 80% or more, 90% or more, or 100%.

(Type of Oxides: Including at Least One Selected from Group Consisting of Fe Oxides, Ba Oxides, Na Oxides, Ti Oxides, Si Oxides, Zr Oxides, Mg Oxides, Al Oxides, Mn Oxides, and K Oxides, while Excluding CaO)

(Total Amounts of Oxides Excluding CaO by Mass % with Respect to Total Mass of Flux-Cored Wire: 0.30% to Less than 3.50%)

The flux of the flux-cored wire according to the present embodiment includes oxides of 0.30% to less than 3.50% in total. The type of the oxides includes one or at least two selected from the group consisting of Fe oxides, Ba oxides, Na oxides, Ti oxides, Si oxides, Zr oxides, Mg oxides, Al oxides, Mn oxides, and K oxides, while excluding CaO. In the present embodiment, the total of amounts of oxides excluding CaO by mass % with respect to the total mass of the flux-cored wire is defined as "β". In the present embodiment, there are cases where "oxides excluding CaO" is simply referred to as "oxides".

Oxides excluding CaO have an effect of favorably maintaining a weld bead shape. In a case where total amount of oxides excluding CaO is less than 0.30%, a weld bead shape may deteriorate. In order to favorably maintain the weld bead shape, the lower limit for total amount of oxides excluding CaO may be set to 0.40%, 0.50%, 0.60%, or 0.70%. However, in a case where β is 3.50% or more, sometimes toughness of the weld metal may be degraded. The upper limit for total amount β may be set to 3.00%, 2.50%, 2.25%, 2.00%, 1.75%, 1.50%, 1.25%, 1.00%, 0.90%, 0.80%, or 0.70%.

The type of oxides excluding CaO is not particularly limited. In the present embodiment, β is considered as a content in total having oxides included in a binder used for granulating the flux, in addition to the total amount of Fe oxides, Ba oxides, Na oxides, Ti oxides, Si oxides, Zr oxides, Mg oxides, Al oxides, Mn oxides, and K oxides.

(Amount of Ti Oxides by Mass % with Respect to Total Mass of Flux-Cored Wire: 0.10% to Less than 2.50%)

Ti oxides contribute to amelioration of the weld bead shape. Even in a case where the total amount of oxides excluding CaO ranges from 0.30% to less than 3.50%, in a case where Ti oxides included in oxides excluding CaO is less than 0.10%, sometimes the weld bead shape deteriorates. Therefore, the lower limit value for the amount of Ti oxides is required to be set to 0.10%. In order to achieve a more favorable weld bead shape by using Ti oxides as an arc stabilizer, the lower limit for amount of Ti oxides may be set to 0.15%, 0.20%, 0.25%, 0.30%, 0.40%, or 0.45%. Meanwhile, in a case where the amount of Ti oxides is 2.50% or more, sometimes toughness of the weld metal is degraded. Therefore, the upper limit value for the amount of Ti oxides is required to be set to less than 2.50%. In order to further ameliorate toughness of the weld metal, the upper limit for amount of Ti oxides may be set to 2.40%, 2.20%, 2.00%, 1.80%, 1.50%, 1.25%, 1.00%, 0.90%, 0.80%, 0.70%, 0.60%, or 0.50%.

(Ratio of α to β: Preferably 0.10 to 4.00)

In the flux-cored wire according to the present embodiment, in order to set the amount of diffusion hydrogen in a weld metal to be smaller than 1.0 ml/100 g, it is preferable that the ratio of α to β (that is, α/β) is set to 0.10 to 4.00. In a case where α/β is set to 0.10 or more, it is possible to further reduce the amount of diffusion hydrogen in a weld metal. As necessary, the lower limit value for α/β may be set to 0.20, 0.30, 0.50, or 0.70. In a case where α/β exceeds 4.00, welding fume and slag may be excessively generated and welding workability may be degraded. However, as long as the above-described conditions related to fluorides and oxides are satisfied, preferable properties are obtained even if α/β is less than 0.10 or more than 4.00. A preferable upper limit value for the ratio of α to β is 3.8, 3.50, 3.00, 2.50, 2.00, or 1.50.

(Total Amount of Carbonates by Mass % with Respect to Total Mass of Flux-Cored Wire: 0% to 3.50%)

(Type of Carbonates: Including One or at Least Two Selected from Group Consisting of $MgCO_3$, $Na_2CO_3$, $LiCO_3$, $CaCO_3$, $K_2CO_3$, $BaCO_3$, $FeCO_3$, and $MnCO_3$)

(Total Amounts of One or at Least Two of $MgCO_3$, $Na_2CO_3$, and $LiCO_3$ by Mass % with Respect to Total Mass of Flux-Cored Wire: 0 to 3.00%)

The flux of the flux-cored wire according to the present embodiment is not required to include carbonates. Therefore, in the flux-cored wire according to the present embodiment, the lower limit value for the amount of carbonates is 0%. However, carbonates are ionized due to arc and generate $CO_2$ gas. $CO_2$ gas lowers partial pressure of hydrogen in the welding atmosphere and causes the amount of diffusion hydrogen in a weld metal to be reduced. In order to achieve this effect, the flux of the flux-cored wire according to the present embodiment may include carbonates. A preferable lower limit value for the total amount of carbonates is more than 0.30%. In order to further reduce the amount of diffusion hydrogen in a weld metal, the lower limit for the total amount of carbonates may be set to 0.50%, 1.00%, or 1.50%.

Meanwhile, in a case where the total amount of carbonates is more than 3.50%, since welding fume is excessively generated, welding workability deteriorates. In order to further reduce the generation amount of welding fume, the upper limit for the total amount of carbonates may be set to 3.00%, 2.50%, 2.00%, 1.50%, 1.00%, 0.50%, 0.10%, 0.04%, 0.02%, or 0.01%.

It is preferable that the type of carbonates included in the flux of the flux-cored wire according to the present embodiment includes one or at least two selected from the group consisting of $MgCO_3$, $Na_2CO_3$, $LiCO_3$, $CaCO_3$, $K_2CO_3$, $BaCO_3$, $FeCO_3$, and $MnCO_3$. However, carbonates are not limited thereto. As long as the amount of carbonates is within the range described above, the type and the composition of carbonates are not limited.

The total amount of one or at least two of $MgCO_3$, $Na_2CO_3$, and $LiCO_3$ included in the carbonates described above is required to range from 0% to 3.00%. Even if the total amount of carbonates ranges from 0% to 3.50%, in a case where the total amount of one or at least two of $MgCO_3$, $Na_2CO_3$, and $LiCO_3$ included in the carbonates is more than 3.00%, weld beads are likely to drip, and welding workability deteriorates. In order to prevent weld beads from dripping, the upper limit for the total amount of the carbonates may be set to 2.70%, 2.50%, or 2.00%. Meanwhile, in order to further reduce hydrogen in the weld metal, the lower limit for the total amount of one or at least two of $MgCO_3$, $Na_2CO_3$, and $LiCO_3$ may be set to 0.30%, 0.50%, 0.75%, or 1.00%.

(Amount of CaO by Mass % with Respect to Total Mass of Flux-Cored Wire: 0% to Less than 0.20%)

There are cases where CaO is included in the flux of the flux-cored wire according to the present embodiment. However, in the flux-cored wire according to the present embodiment, the amount of CaO in the flux is required to be set to less than 0.20%. Since CaO changes into CaOH which is a compound including hydrogen, diffusion hydrogen in a weld metal is increased, cold-cracking resistance of a weld metal is harmed. A preferable upper limit value for the amount of CaO is 0.18%, 0.10%, 0.05%, 0.02%, or 0.01%. Since it is preferable that CaO is not included, the lower limit value for the amount of CaO is 0%. Since there is a concern that CaO of 0.20% or more is included in an ordinary material for a flux as impurities, it is necessary to select a material which does not include CaO when manufacturing the flux-cored wire according to the present embodiment.

(Amount of Iron Powder by Mass % with Respect to Total Mass of Flux-Cored Wire: 0% to Less than 10.0%)

As described above, the flux of the flux-cored wire according to the present embodiment may include iron powder. There are cases where iron powder is contained as necessary in order to adjust the filling rate of the flux in the flux-cored wire or to improve welding efficiency. However, there are cases where oxygen adhered on a surface layer of iron powder causes the oxygen content to increase in a weld metal and causes toughness to be degraded. Therefore, in the flux-cored wire according to the present embodiment, the amount of iron powder is required to be less than 10.0%. A preferable upper limit value for the amount of iron powder is 8%, 6%, 4%, 2%, or 1%. Since it is preferable that iron powder is not included, in the flux-cored wire according to the present embodiment, the lower limit value for the amount of iron powder is 0%. Iron powder and the Fe oxides described above are different from each other. Iron powder mainly consists of Fe which is not oxidized, and Fe oxides mainly consist of iron oxides such as red iron ore, limonite, and magnetite. Both can be distinguished by using a known component analyzer such as EPMA.

The flux according to the present embodiment may include components other than fluorides, carbonates, iron powder, and oxides excluding CaO, as described above. For example, a chemical composition of a deposited metal (will be described below) and an alloy component for controlling Ceq may be contained in the flux not in a state of fluorides, oxides, or carbonates (for example, a state of metal powder or alloy powder).

Next, chemical compositions of the flux-cored wire according to the present embodiment, excluding fluorides, oxides excluding CaO, CaO, carbonates, and iron powder, will be described. In description below, unless otherwise described particularly, "%" denotes "mass % with respect to the total mass of the flux-cored wire". The chemical compositions described below may be included in a steel sheath, may be included in the flux as metal powder or alloy powder as described above, or may be included in coating on the outer surface of the steel sheath. Fluorides, oxides excluding CaO, CaO, and carbonates are mainly discharged to the outside of the weld metal as slag at the time of welding, and the elements included in a state of a metal or an alloy are mainly dissolved in the weld metal. In description below, there are cases where "the chemical compositions of the flux-cored wire excluding fluorides, oxides excluding CaO, CaO, carbonates, and iron powder" are simply referred to as "the chemical compositions of the flux-cored wire".

(C: 0.003% to 0.200%)

The larger the C content in a flux-cored wire is, the larger the C content in a weld metal becomes and the higher strength the weld metal has. However, if the C content is too high, carbides may be excessively generated in the weld metal and toughness of the weld metal may deteriorate. Then, in order to secure toughness of the weld metal, the upper limit for the C content is set to 0.200%. In addition, in order to secure low-temperature toughness, the upper limit for the C content may be set to 0.100%, 0.090%, 0.08%, or 0.070%. Since it is difficult to have the C content in a wire to be less than 0.003% due to restrictions on steel making when sheath materials are manufactured, the lower limit is set thereto. As necessary, the lower limit for the C content may be set to 0.010%, 0.020%, 0.030%, 0.040%, 0.050%, or 0.060%.

(Si: 0.20% to 1.50%)

Si is a deoxidizing element and functions to reduce the oxygen content in a weld metal, to enhance cleanliness of a weld metal, and to improve toughness of a weld metal. In order to achieve this effect, the lower limit for the Si content is required to be set to 0.20%. Meanwhile, in a case where the Si content exceeds 1.50%, sometimes toughness of a weld metal deteriorates. Therefore, the upper limit for the Si content is set to 1.50%. In order to sufficiently reduce the amount of oxygen in the weld metal, the lower limit for the Si content may be set to 0.25%, 0.30%, or 0.35%. In order to stably secure toughness of a weld metal, the upper limit for the Si content may be set to 0.80%, 0.70%, or 0.60%.

(Mn: 1.00% to 3.50%)

Mn reduces the amount of oxygen in a weld metal and enhances cleanliness of the weld metal, and thereby improves toughness of the weld metal. In order to ensure this effect, the lower limit for the Mn content is required to be set to 1.00%. Meanwhile, in a case where the Mn content exceeds 3.50%, intergranular embrittlement sensitivity of the weld metal increases, thereby leading to concern for deterioration of toughness of the weld metal. Therefore, the upper limit for the Mn content is set to 3.50%. In order to increase strength of the weld metal more stably, the lower limit for the Mn content may be set to 1.01%, 1.20%, 1.40%, or 1.60%. In order to further improve toughness of the weld metal, the upper limit for the Mn content may be set to 2.60%, 2.40%, 2.20%, or 2.00%.

(Mg: 0.10% or Less)

The upper limit value for the Mg content of the flux-cored wire according to the present embodiment is 0.10%, and it is preferable that the Mg content is little. The inventors have ascertained that even if there is a slight amount of Mg in the flux-cored wire, Mg increases the amount of diffusion hydrogen of a weld metal.

Figure 5:
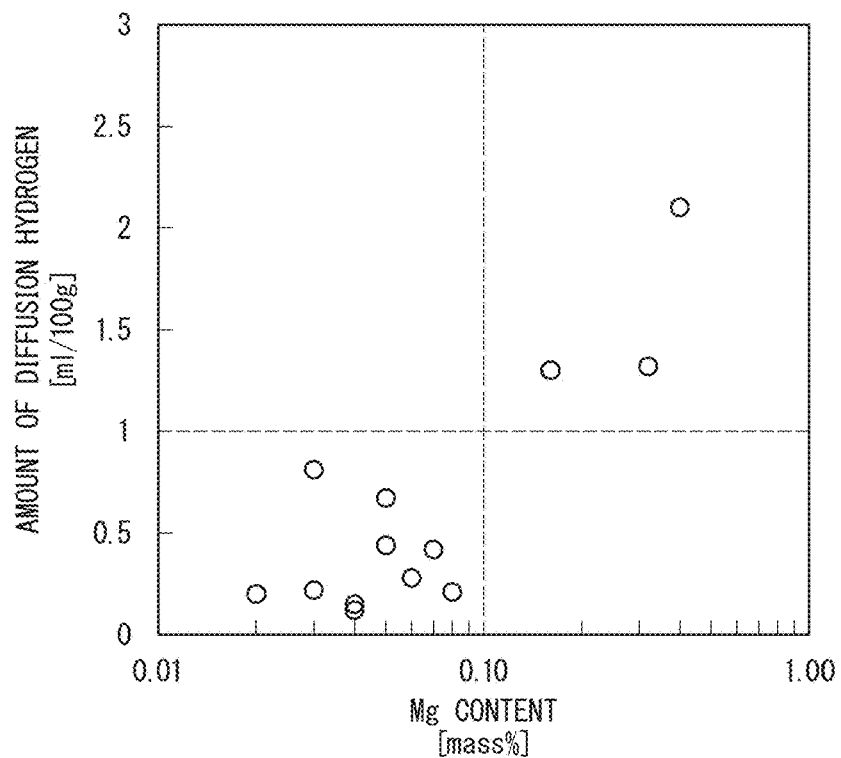
FIG. 5 is a view illustrating a relationship between a Mg content of a flux-cored wire and the amount of diffusion hydrogen of a weld metal obtained by using the flux-cored wire.

An experiment in which the inventors have obtained the above-described knowledge will be described below. Various flux wires differing in the Mg content are subjected to welding under the same conditions as those when the graph of FIG. 2 is made. Then, the amount of diffusion hydrogen of a weld metal is obtained by the same method as that when the graph of FIG. 2 is made. The graph of FIG. 5 illustrates the relationship between the Mg content of the flux-cored wire and the amount of diffusion hydrogen of a weld metal obtained from the experiment described above. From this graph, it is ascertained that in a case where the Mg content of the flux-cored wire is 0.10% or less, the amount of diffusion hydrogen is reduced to 1.0 ml/100 g or smaller. Based on this experimental result, the inventors have ascertained that the Mg content of the chemical composition of the flux-cored wire according to the present embodiment is required to be 0.10% or less and is preferably set to 0.08% or less, 0.07% or less, 0.05%, 0.03% or less, or 0.01% or less. In a case where the amount of $TiO_2$ is small, the effect of increasing the amount of diffusion hydrogen due to Mg becomes remarkable.

Since Mg is not an essential component, the lower limit value for the Mg content of the chemical composition of the flux-cored wire is 0%. Meanwhile, Mg has an effect of reducing oxygen in a weld metal and improving toughness of a weld metal. Therefore, the Mg content of the chemical composition of the flux-cored wire may be set to 0.05% or more.

(P: 0.020% or Less)

It is preferable that the P content is reduced as much as possible, since P is an impurity element and sometimes decreases toughness and ductility of a weld metal in a case where the P content in the weld metal is too high. In order to set the P content within a range in which bad influence of P with respect to toughness and ductility is permitted, the P content is 0.020% or less. In order to certainly prevent toughness and ductility of the weld metal from deteriorating, it is preferable that the P content is 0.017% or less, 0.015%, 0.012% or less, or 0.010% or less. It is unnecessary to limit the lower limit for the P content. The lower limit for the P content may be 0%.

(S: 0.020% or Less)

S is also an impurity element. It is preferable that the S content is reduced as much as possible, since sometimes S deteriorates toughness of a weld metal in a case where the S content in the weld metal is too high. In order to set the S content within a range in which bad influence of S with respect to toughness is permitted, the S content is 0.020% or less. In order to certainly prevent deterioration of toughness of the weld metal, it is preferable that the S content is 0.017% or less, 0.015% or less, 0.012% or less, or 0.010% or less. It is unnecessary to limit the lower limit for the S content. The lower limit for the S content may be 0%.

(Al: 0.001% to 0.300%)

Al is a deoxidizing element. Similar to Si, Al reduces the oxygen content in a weld metal, enhances cleanliness of the weld metal, and improves toughness of the weld metal. In order to achieve this effect, the lower limit for the Al content is required to be set to 0.001%. Meanwhile, in a case where the Al content exceeds 0.300%, Al forms nitrides and oxides, so that toughness of a weld metal deteriorates. Therefore, the upper limit for the Al content is 0.300%. In addition, in order to sufficiently achieve an effect of improving toughness of the weld metal, the lower limit for the Al content may be set to 0.0015%, 0.002%, 0.003%, or 0.004%. In order to prevent formation of coarse oxides, the upper limit for the Al content may be set to 0.275%, 0.250%, or 0.200%.

(Ni: 0.50% to 4.00%)

Since Ni is only element which can improve toughness of a weld metal having any structure and any component by a solute toughening (effect of improving toughness by solute). In particular, Ni is effective to improve toughness of a high-strength weld metal having tensile strength of 780 MPa or higher. In order to obtain an effect of solute toughening, the lower limit for the Ni content is required to be set to 0.50%. The more the Ni content is, the more advantage the Ni content has for improving toughness. However, in a case where the Ni content exceeds 4.00%, sometimes an island martensite is formed in a weld metal and toughness of the weld metal deteriorates. Therefore, the upper limit for the Ni content is set to 4.00%. In order to certainly achieve an effect of improving toughness due to Ni, the lower limit for the Ni content may be set to 0.80%, 1.00%, 1.50%, 2.00%, or 2.20%. In addition, in order to ensure toughness of the weld metal, the upper limit for the Ni content may be set to 3.30%, 3.10%, 2.90%, or 2.70%.

(Mo: 0.10% to 2.00%)

Mo is an element for improving hardenability. Furthermore, Mo forms fine carbide, and increases tensile strength by precipitation strengthening. In addition, in multi-pass welding, Mo achieves an effect of preventing deterioration of strength when a weld metal is reheated by subsequent path and preventing deterioration of toughness. Since plates are used in large size structure, in this case, multi-pass welding is performed. In multi-pass welding, a weld metal formed by a preceding welding-path is reheated by a succeeding welding-path, and thereby the weld metal formed by the preceding welding-path is softened. In a case where a material to be welded (parent material) is high strength steel of 780 MPa class, structure of a weld metal is mainly bainite, and thereby the degree of softening of the weld metal becomes large. Therefore, in this case, it is difficult to stably secure strength of the weld metal. Furthermore, since cementite of the weld metal is coarsened by the reheating, toughness of the weld metal is deteriorated. Mo achieves an effect of preventing deterioration of strength of a weld metal by forming fine carbide when a weld metal is reheated in multi-pass welding. In addition, Mo achieves an effect of preventing deterioration of toughness of a weld metal by preventing cementite of a weld metal from being coarsened.

In order to achieve these effect, the lower limit for the Mo content is required to be set to 0.10%. On the other hand, in a case where the Mo content exceeds 2.00%, precipitates are coarsened, and sometimes toughness of a weld metal deteriorates. Therefore, the upper limit for the Mo content is 2.00%. In order to further prevent deteriorations of strength and toughness of a weld metal due to the reheating, the lower limit for the Mo content may be set to 0.20%, 0.30%, or 0.50%. In addition, in order to prevent deterioration of toughness of a weld metal due to excessive Mo content, the upper limit for the Mo content may be set to 0.90%, 0.80%, or 0.70%.

The flux-cored wire according to the present embodiment can include one or at least two of Cu, Cr, V, Ti, Nb, B, and Bi as selected element, as an alloy component and a deoxidizing component, and further in accordance with the level of strength of steel sheet to be welded or the required degree of toughness of a weld metal. However, regardless of the presence or absence of selected element, if the content of essential element in a flux-cored wire is within the above-described range, said flux-cored wire is considered as the flux-cored wire according to the present embodiment. Therefore, the lower limit for each of Cu, Cr, V, Ti, Nb, B, and Bi is 0%.

(Cu: 0% to 0.50%)

Cu can improve strength and toughness of a weld metal. The lower limit value for the Cu content is 0%. In order to achieve these effects, the lower limit for the Cu content may be set to 0.10%. Meanwhile, in a case where the Cu content exceeds 0.50%, sometimes toughness of a weld metal deteriorates. Therefore, the upper limit for the Cu content when Cu is included in the flux-cored wire is set to 0.50%. In order to certainly achieve the effect due to Cu and prevent deterioration of toughness, the lower limit for the Cu content may be set to 0.15% or 0.20%. In order to improve toughness. The upper limit for the Cu content may be set to 0.40% or 0.30%.

In addition, Cu may be included in coating on the surface of the steel sheath of the flux-cored wire and may be included in the flux as a single body or an alloy. Cu coating also has an effect of improving antirust properties, conductivity, and chip wear resistance. Therefore, the Cu content of the flux-cored wire is the total amount of Cu contained in the steel sheath and/or the flux. In a case where a surface of the flux-cored wire is coated by copper, the Cu content of the flux-cored wire is the total amount of Cu contained in the copper coating in addition to Cu contained in the steel sheath and/or the flux.

(Cr: 0% to 1.50%)

Cr is an element which is effective to increase strength of a weld metal, since Cr improves hardenability of the weld metal. The lower limit for the Cr content is 0%. In order to achieve the effect, the lower limit for the Cr content may be set to 0.10%. On the other hand, in a case where the Cr content exceeds 1.50%, sometimes a bainite of the weld metal is non-uniformly hardened and toughness deteriorates. Therefore, the upper limit for the Cr content when Cr is included is set to 1.50%. In order to prevent deterioration of toughness due to Cr, the upper limit for the Cr content may be set to 1.00%, 0.75%, 0.50%, or 0.25%.

(V: 0% to 0.40%)

V is an element which is effective to increase strength of a weld metal, since V improves hardenability of the weld metal. The lower limit for the V content is set to 0%. In order to achieve the effect, the lower limit for the V content may be set to 0.01%. On the other hand, in a case where the V content exceeds 0.40%, sometimes deteriorations of hardening and toughness of a weld metal occur due to precipitation of carbides in the weld metal. Therefore, the upper limit for the V content when V is included is set to 0.40%. In order to certainly achieve the effect due to V and prevent deterioration of toughness due to excessive content of V, the upper limit for the V content may be set to 0.30%, 0.20%, 0.10%, or 0.05%.

(Ti: 0% to 0.30%)

Similar to Al, Ti is also an element which is effective as a deoxidizing element and has an effect of reducing the oxygen content in a weld metal. In addition, Ti also has an effect of fixing a solute N of a weld metal and relaxing bad influence of the solute N with respect to toughness. The lower limit for the Ti content is set to 0%. In order to achieve these effects, the lower limit for the Ti content may be set to 0.01%. However, in a case where the Ti content in the flux-cored wire exceeds 0.30%, a possibility of toughness deterioration caused by coarse oxides formed therein and toughness deterioration due to excessive precipitation strengthening occurring in a weld metal increases. Therefore, the upper limit for the Ti content when Ti is included is set to 0.30%. In order to certainly achieve the effect due to Ti, the lower limit for the Ti content may be set to 0.015%, 0.02%, or 0.04%. In addition, in order to further prevent deterioration of toughness due to Ti, the upper limit for the Ti content may be set to 0.20%, 0.10%, or 0.05%.

(Nb: 0% to 0.10%)

Nb is an element which is effective to secure tensile strength of a weld metal by precipitation strengthening, since Ni forms fine carbide in the weld metal. The lower limit for the Nb content is set to 0%. In order to achieve these effects, the lower limit for the Nb content may be set to 0.01%. On the other hand, it is not preferable that the Nb content exceeds 0.10%, since sometimes Nb which is excessively contained in the weld metal forms coarse precipitates in the weld metal and deteriorates toughness of the weld metal. Therefore, the upper limit for the Nb content when Nb is included is set to 0.10%. In order to certainly achieve the effect due to Nb, the lower limit for the Nb content may be set to 0.015% or 0.02%. In addition, in order to further prevent deterioration of toughness due to Nb, the upper limit for the Nb content may be set to 0.05%, 0.04%, or 0.03%.

(B: 0% to 0.0100%)

B in a proper amount contained in a weld metal is bonded with the solute N and forms BN, thereby reducing bad influence of the solute N with respect to toughness. In addition, B also has an effect of enhancing hardenability and contributing to improvement of strength of a weld metal. The lower limit for the B content is set to 0%. In order to achieve these effects, the lower limit for the B content in the flux-cored wire may be set to 0.0001%. On the other hand, it is not preferable that the B content is more than 0.0100%, since the B content in a weld metal becomes excessive and forms coarse BN and a B compound such as $Fe_{23}(C, B)_6$, and a possibility that toughness of a weld metal deteriorates on the contrary increases. Therefore, the upper limit for the B content when B is included is set to 0.0100%. In order to certainly achieve the effect due to B, the lower limit for the B content may be set to 0.0003% or 0.0010%. In addition, in order to further prevent deterioration of toughness due to B, the upper limit for the B content may be set to 0.0080%, 0.0060%, or 0.0040%.

(Bi: 0% to 0.0100%)

Since Bi is not an essential component, the lower limit value for the Bi content of the chemical composition of the flux-cored wire is 0%. Meanwhile, Bi is an element which ameliorates exfoliation properties of slag. Therefore, the Bi content of the chemical composition of the flux-cored wire may be set to 0.0010% or more. In a case where the Bi content of the chemical composition of the flux-cored wire exceeds 0.0100%, a solidification crack is likely to be generated in a weld metal. Accordingly, the upper limit value for the Bi content of the chemical composition of the flux-cored wire is 0.0100%. The upper limit value for the Bi content of the chemical composition of the flux-cored wire is preferably 0.0080%.

In the present invention, in addition to the above-described components, in order to adjust ductility and toughness of a weld metal, as necessary, it is allowed that one or two of Ca and REM is included in the flux-cored wire within the following range. However, regardless of presence or absence of Ca and REM, the contents of essential elements in a flux-cored wire are within the above-described range, said flux-cored wire is considered as the flux-cored wire according to the present embodiment. Therefore, the lower limit for the content of each of Ca and REM is 0%.

(Ca: 0% to 0.50%)
(REM: 0% to 0.0100%)

Both Ca and REM change the structure of sulfides and refine the size of sulfides and oxides, thereby improving toughness of a weld metal. The lower limit for the content of each of Ca and REM is set to 0%. In order to achieve the effect, the lower limit for the Ca content may be set to 0.01%, and the lower limit for the REM content may be set to 0.0002%. Meanwhile, in a case where at least one of the Ca content and the REM content is excessive, sulfides and oxides are coarsened, and toughness of a weld metal deteriorates. In addition, in a case where at least one of the Ca content and the REM content is excessive, deteriorations of weld bead shape and weldability are likely to occur. Therefore, in a case where at least one of the Ca content and the REM content is included, the upper limit for the Ca content is set to 0.50%, and the upper limit for the REM content is set to 0.0100%. In order to certainly achieve the effects due to these elements, the lower limit for the Ca content may be set to 0.03%, and the lower limit for the REM content may be set to 0.0003%. From a viewpoint of preventing deterioration of toughness of a weld metal, the upper limit for the Ca content may be set to 0.45%, 0.40%, 0.35%, or 0.30%, and the upper limit for the REM content may be set to 0.0090%, 0.0080%, 0.0070%, or 0.0060%.

(Ceq: 0.45 to 1.20 Mass %)

The flux-cored wire according to the present embodiment includes the above-described elements as an alloy component and a deoxidizing component. In addition, in order to secure tensile strength of a weld metal, it is required to further control the contents of C, Si, Mn, Ni, Cr, Mo, and V such that carbon equivalent Ceq which is defined by the following expression and which is defined in "Welding Engineering Standard" is within 0.45 to 1.20 mass %.

$$Ceq=[C]+[Si]/24+[Mn]/6+[Ni]/40+[Cr]/5+[Mo]/4+[V]/14$$

In the expression described above, the bracketed element symbols indicate, by unit mass % with respect to the total mass of the flux-cored wire, the amounts of the element corresponding to each of the element symbols included in the chemical composition of the flux-cored wire excluding fluorides, oxides excluding CaO, CaO, carbonates, and iron powder. That is, Ceq calculated from the chemical composition of the flux-cored wire of the present embodiment (Ceq of the flux-cored wire) is calculated without considering the amounts of the elements included in the flux-cored wire in a state of fluorides, oxides excluding CaO, CaO, or carbonates. Since most of the elements included in the flux-cored wire in a state of fluorides, oxides excluding CaO, CaO, or carbonates are discharged to the outside of a weld metal as slag at the time of welding, hardenability of a weld metal is not substantively influenced.

In a case where Ceq value of the flux-cored wire is high, a weld metal is hardened so that tensile strength of the weld metal is improved, whereas toughness of a weld metal are degraded. An object of the flux-cored wire according to the present embodiment is to obtain a weld metal having tensile strength of 690 MPa or higher. However, in a case where the Ceq value is less than 0.45%, the weld metal having tensile strength of 690 MPa or higher cannot be obtained. On the other hand, in a case where the Ceq value exceeds 1.20%, tensile strength of a weld metal becomes excessive, and toughness of a weld metal deteriorates. Therefore, a range of Ceq is set to 0.45 to 1.20%. In order to efficiently improve both tensile strength and toughness, the lower limit for Ceq may be set to 0.48%, 0.50%, 0.52%, 0.55%, 0.58%, or 0.61%, and the upper limit for Ceq may be set to 1.15%, 1.10%, 1.05%, 1.00%, 0.95%, 0.90%, 0.85%, or 0.80%.

Moreover, the inventors have ascertained the reason that it is preferable for the chemical composition of the flux-cored wire according to the present embodiment to satisfy the following expression.

$$([Mg]+10\times[Al])\leq 0.45$$

Figure 6:
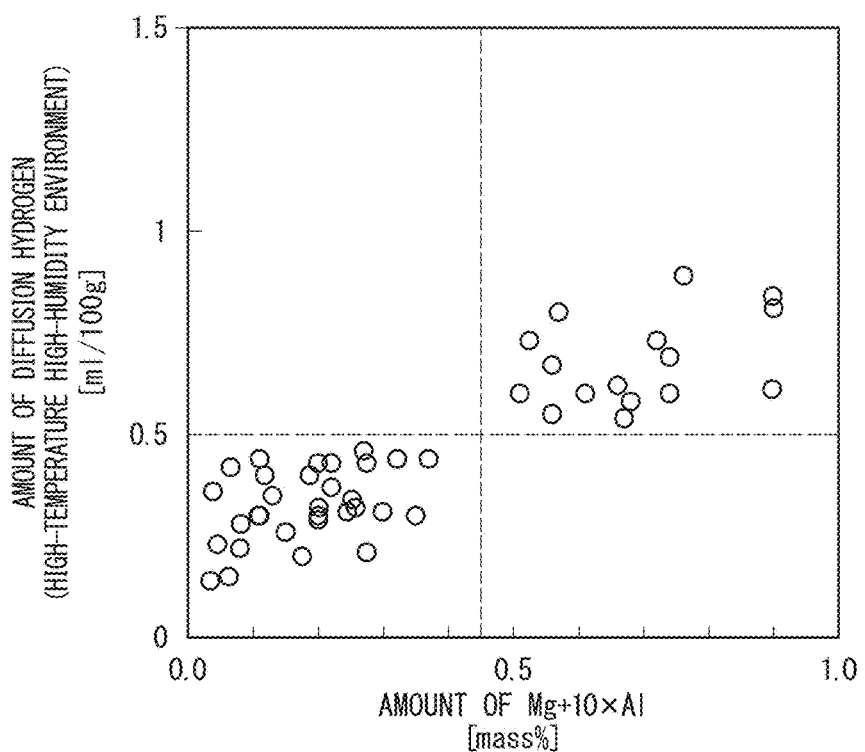
FIG. 6 is a view illustrating a relationship between "Mg+10×Al" of a flux-cored wire and an amount of diffusion hydrogen of a weld metal obtained by using the flux-cored wire.

[Mg] and [Al] indicate, by unit mass % with respect to the total mass of the flux-cored wire, the contents of Mg and Al included in the chemical composition of the flux-cored wire excluding fluorides, oxides excluding CaO, and carbonates. The inventors have ascertained that there is a relationship between the amounts of Mg and Al included in the chemical composition of the flux-cored wire, and the amount of diffusion hydrogen, and particularly, controlling over "[Mg]+10×[Al]" in a case of a welding atmosphere of high-temperature and high-humidity contributes to reduction of the amount of diffusion hydrogen of a weld metal. Moreover, the inventors have found that there is a favorable linear relationship, as illustrated in FIG. 6, between "[Mg]+10×[Al]" and the amount of diffusion hydrogen by performing multiple regression analysis of the amount of diffusion hydrogen of a weld metal obtained from various flux-cored wires differing in the Mg content and the Al content.

An experiment in which the inventors have obtained the above-described knowledge will be described below. The various flux wires differing in "[Mg]+10×[Al]" as described above are subjected to welding under the following conditions, and the amount of diffusion hydrogen of a weld metal obtained through the welding is measured by the same method as that when the graph of FIG. 2 is made.

Type of welding gas: 100% $CO_2$
Welding current: 270 A
Temperature of welding environment: 30° C.
Humidity of welding environment: 80%

The above-described welding environment is considered as a high-temperature high-humidity environment in the technical field of the flux-cored wire according to the present embodiment. The graph of FIG. 6 illustrates the relationship between "[Mg]+10×[Al]" and the amount of diffusion hydrogen of a weld metal obtained from the experiment described above. From this graph, it is ascertained that in a case where "[Mg]+10×[Al]" is 0.45% or less, even if the welding environment is a high-temperature high-humidity environment, the amount of diffusion hydrogen is further reduced. Based on this experimental result, the inventors have ascertained the reason that it is preferable for the chemical composition of the wire according to the present embodiment to be controlled such that "[Mg]+10×[Al]" becomes 0.45% or less, 0.40% or less and more preferably becomes 0.38%, or 0.35% or less. In a case where welding is performed in a high-temperature high-humidity environment, the amount of diffusion hydrogen of a weld metal is likely to increase. Accordingly, this feature exhibits a noticeable effect such as amelioration of weldability in a high-temperature high-humidity environment. However, even if "[Mg]+10×[Al]" exceeds 0.45%, as long as the Mg content and the Al content are within the numerical value ranges described above, the characteristics of the flux-cored wire according to the present embodiment are not harmed.

Hereinabove, the reasons for limitation related to the amount of each of the elements included in the chemical composition of the flux-cored wire according to the present embodiment have been described. Other remainder components are Fe and impurities. The Fe component includes Fe in the steel sheath, Fe in iron powder included in the flux, and Fe in alloy component.

Subsequently, the shape of the flux-cored wire according to the present embodiment will be described.

Figure 7A:
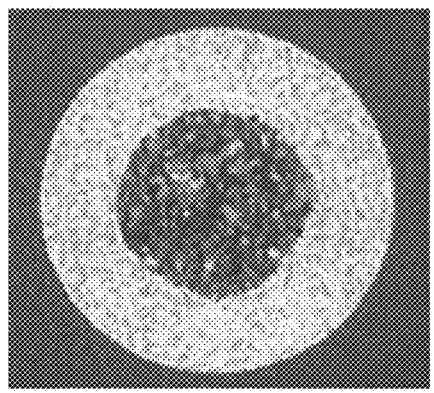
FIG. 7A is a photograph of a cut section of a flux-cored wire made by performing welding in which edge surfaces abut each other.
Figure 7B:
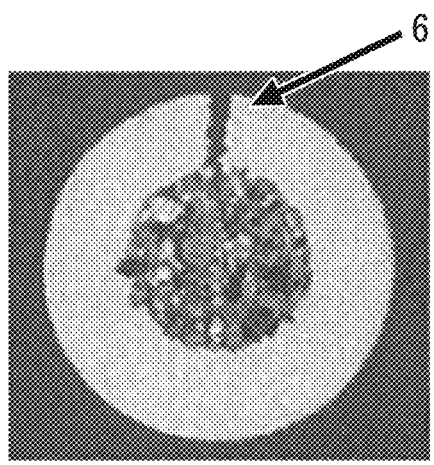
FIG. 7B is a photograph of a cut section of a flux-cored wire made by causing edge surfaces to abut each other.
Figure 7C:
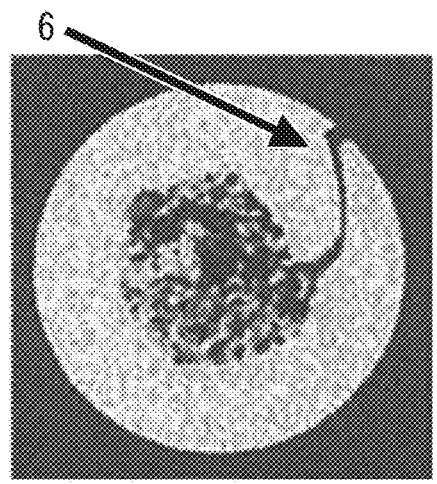
FIG. 7C is a photograph of a cut section of a flux-cored wire made by causing edge surfaces to abut each other.

FIGS. 7A to 7C show a cut section of a flux-cored wire. FIG. 7A shows a flux-cored wire which is obtained by abutting the edge surfaces and welding. FIG. 7B shows a flux-cored wire which is obtained by abutting the edge surfaces. FIG. 7C shows a flux-cored wire which is obtained by caulking the edge surfaces. Thus, flux-cored wires are distinguished between wires in which there is no slit-shaped gap in a steel sheath as illustrated in FIG. 7A, and wires in which a slit-shaped gap 6 is included in a steel sheath as illustrated in FIGS. 7B and 7C. In the flux-cored wire according to the present embodiment, any of cross section structures can be employed. However, in order to prevent a cold crack of a weld metal, a wire without slit-shaped gap (seamless wire) is preferable.

Hydrogen invading a weld at the time of welding is diffused in a weld metal and a material to be welded (parent material) and is piled up in a stress concentration zone, thereby causing a cold crack. It is considered that supply sources of hydrogen are moisture in a welding material, moisture incorporated from the air, rust and scale adhered to a surface of a steel, and the like. In a case where welding is performed in a state where cleanness of weld and the conditions of a gas shield are strictly managed, hydrogen of moisture included in a wire becomes a main supply source of hydrogen for diffusion hydrogen of the welded joint.

Therefore, it is desirable to remove slit-shaped gap in a steel sheath, and to prevent hydrogen in the air from invading the inside of a flux through the steel sheath before the flux-cored wire is used after the flux-cored wire is manufactured. In a case where the steel sheath has slit-shaped gap (seam), it is not possible to sufficiently prevent a supply source such as moisture from invading the inside of a flux-cored wire, since moisture in the air is likely to invade the inside of a flux through slit-shaped gap. In a case where a period of time before the flux-cored wire is used after the flux-cored wire is manufactured is long, it is desirable to take countermeasures for preventing invasion of the hydrogen sources, such as the flux-cored wire is entirely vacuum-packed, the flux-cored wire is entirely retained inside a container such that the flux-cored wire can be held in a dry state, or a gap in the steel sheath of the flux-cored wire is filled by a method such as brazing.

The diameter of the flux-cored wire according to the present embodiment is not particularly regulated. For example, the diameter ranges from φ1.0 to φ2.0 mm. Generally, the diameter of a flux-cored wire ranges from φ1.2 to φ1.6 mm. The filling rate of the flux-cored wire according to the present embodiment is not particularly limited as long as the above-described conditions are satisfied. For example, the lower limit value for the filling rate of the flux-cored wire according to the present embodiment is generally set to 10% or 12%. For example, the upper limit value for the filling rate of the flux-cored wire according to the present embodiment is generally set to 20% or 17%.

In addition, in order to improve feedability of a wire, the flux-cored wire according to the present embodiment may further include a lubricating oil which coats the wire surface. Various types can be used as a lubricant for a welding wire. However, in order to reduce diffusion hydrogen and prevent a cold crack of a weld metal, it is preferable that the lubricating oil which coats the wire surface is an oil such as perfluoropolyether oil (PFPE) including no hydrogen. In addition, as described above, the flux-cored wire according to the present embodiment may further include coating formed on the wire surface. In this case, the surface of coating is coated with the lubricant.

The hydrogen content included in the flux-cored wire according to the present embodiment is not particularly regulated. The reason is that the hydrogen content in the flux-cored wire fluctuates before being in use after the wire is manufactured. However, in a stage immediately after manufacturing, it is preferable that the hydrogen content is 12 ppm or less with respect to the total mass of the flux-cored wire. There is concern that the hydrogen content in the flux-cored wire may increase due to moisture invading the inside of the flux-cored wire while the flux-cored wire is retained. Therefore, in a case of a long period of time before the wire is used after the wire is manufactured, it is desirable that invasion of moisture is prevented by the way described above.

Next, a manufacturing method of the flux-cored wire according to the present embodiment will be described. The flux-cored wire according to the present embodiment can be manufactured by an ordinary manufacturing method of a flux-cored wire. Hereinafter, an example of the manufacturing method will be described.

A manufacturing method of a flux-cored wire having a seamless shape includes a step of preparing a flux, a step of obtaining a U-shaped open pipe by performing forming using a forming roll while feeding a steel strip in a longitudinal direction, a step of supplying the flux to the inside of the open pipe through an opening portion of the open pipe, a step of performing abutment welding of edge surfaces of the opening portion of the open pipe, the edge surfaces facing each other, a step of performing wire drawing of the seamless pipe, and a step of annealing the flux-cored wire in the middle or after completion of the step of the wire drawing. The flux is prepared such that the amount of fluorides, the chemical composition, the oxide content excluding CaO, the CaO content, the carbonate content, and the like of the flux-cored wire are within the predetermined range as described above. It should be noted that the filling rate of the flux, which is determined based on the width and the thickness of the steel strip as a material of the steel sheath, and the filling amount of the flux, also influences the amount of fluorides of the flux-cored wire, the oxide content excluding CaO, the CaO content, the carbonate content, the chemical composition, and the like. The abutment welding is performed through electric resistance welding, laser welding, TIG welding, or the like. In addition, in the middle of the step of wire drawing or after completion of the step of wire drawing, in order to remove moisture in the flux-cored wire, the flux-cored wire is annealed. In a case where the hydrogen content of the flux-cored wire is set to 12 ppm or less, it is required that the annealing temperature is set to range from 650° C. to 900° C. and the annealing time is set to four hours or longer.

The manufacturing method of a flux-cored wire having a slit-shaped gap is the same as the manufacturing method of a flux-cored wire having a seamless shape other than the point having a step of obtaining a pipe with a slit-shaped gap by forming the open pipe and causing the end portions of the open pipe to abut each other, instead of the step of obtaining the seamless pipe by performing abutment welding of the end portions of the open pipe. The manufacturing method of a flux-cored wire having a slit-shaped gap may further include a step of caulking the abutted end portions of the open pipe. In the manufacturing method of a flux-cored wire having a slit-shaped gap, a pipe having a slit-shaped gap is subjected to wire drawing.

The cut section of a wire without a slit-shaped gap, which is obtained by performing abutment seam welding is observed as FIG. 7A. In the cut section, a welding trace cannot be checked without polishing and etching. Therefore, as described above, sometimes a wire in which abutment seam welding is performed to the steel sheath is referred to as a seamless wire. For example, "New Edition, Introduction of Technology of Welding and Joining" (2008) published by Japan Welding Society, Sanpo Publications Incorporated, p. 111 discloses that such wires are regarded as seamless-type wires.

FIG. 7B shows an example of a flux-cored wire in which welding is not performed after the edge surfaces abut each other. FIG. 7C shows an example in which the edge surfaces are caulked after the edge surfaces abut each other. It is possible to obtain a flux-cored wire having no slit-shaped gap by performing brazing to a gap of a steel sheath of the flux-cored wire as illustrated in FIGS. 7B and 7C.

Tensile strength of a deposited metal when gas shield arc welding is performed using the above-described flux-cored wire is 690 to 1500 MPa which are almost the same as a high tensile steel having tensile strength of 780 MPa or higher. This is because, it is not possible to secure 780 MPa as strength of a welded joint, in a case where tensile strength of the deposited metal is less than 690 MPa. In other words, in a case where tensile strength of the deposited metal is 690 MPa or higher, it is possible to secure 780 MPa as strength of a welded joint. As necessary, the lower limit for tensile strength of the deposited metal may be set to 780 MPa. In a case where tensile strength of the deposited metal is 1500 MPa or higher, toughness of the deposited metal is like to deteriorate. The upper limit for tensile strength of the deposited metal may be limited to 1100 MPa, 1050 MPa, 1000 MPa, 950 MPa, or 900 MPa.

Here, the "deposited metal" indicates a metal which is transferred from filler metal (flux-cored wire) to a weld. Tensile strength of the deposited metal can be obtained by tensile test regulated by JIS Z 3111-2005. In addition, charpy absorbed energy (average of three) of the deposited metal at −40° C. may be 47 J or higher.

The flux-cored wire of the present embodiment described above can be applied to welding of steel materials of any type and is particularly suitable for being used in gas shield arc welding of a high strength steel sheet having tensile strength of 780 MPa or higher. It is possible to obtain a weld metal having the amount of diffusion hydrogen of 1.0 ml/100 g or smaller by performing welding using the flux-cored wire of the present embodiment, and a cold crack of a weld metal is prevented from being generated. Even in a case where a high carbon steel material having high cold-cracking sensitivity is subjected to arc welding in which preheating work is omitted or preheating temperature during preheating work is lowered, a cold crack can be prevented without preheating or at a low preheating temperature in the flux-cored wire according to the present embodiment.

Here, the amount of diffusion hydrogen of the present embodiment is the amount of diffusion hydrogen measured by the method in conformity to JIS Z 3118: 2007 "method of measurement of amount of hydrogen evolved from steel welds". In addition, Pcm (%) of a steel material indicates a value calculated by the following expression.

$$Pcm=(C)+(Si)/30+(Mn)/20+(Cu)/20+(Ni)/60+(Cr)/20+(Mo)/15+(V)/10+5\times(B)$$

The parenthesized elements included in the expression above each indicate the amount (mass %) of each element included in a steel material. The amount of the element which is not contained in the steel material is regarded as 0 mass %.

Next, a manufacturing method of a welded joint according to the present embodiment will be described.

(Manufacturing Method of Welded Joint: Using Flux-Cored Wire According to the Present Embodiment)

The manufacturing method of a welded joint according to the present embodiment includes a step of performing gas shield arc welding of a steel material using the flux-cored wire according to the present embodiment described above. A parent material which is a material to be weld is not limited, but is mainly a steel material having tensile strength of 780 MPa or higher. It is not required to limit the upper limit for tensile strength of a steel material, since it is not able to prevent performing welding to a steel material having tensile strength higher than tensile strength of a weld metal. However, the upper limit for tensile strength of a steel material may be limited to 1100 MPa, 1050 MPa, 1000 MPa, 940 MPa, or 900 MPa. The sheet thickness of a steel material is not limited, but may be limited to 3 to 100 mm, since the sheet thickness of a steel material is generally 3 to 100 mm.

A welded joint composed of a weld metal and base steel sheets which are provided on both sides of the weld metal is formed by setting two sheets of parent material, which are high strength steels, at welding positions such that a groove is formed therebetween, and performing gas shield arc welding using the flux-cored wire according to the present embodiment, and generating a weld metal between the parent materials (base metal portions).

In the manufacturing method of a welded joint according to the present embodiment, the object is achieved by using the flux-cored wire, performing multi-pass welding by gas shield arc welding, and forming a weld metal. The method for the gas shield arc welding is not particularly limited, and it is possible to employ a method which is generally used. For example, as a shielding gas, it is possible to use 100% $CO_2$ gas, a mixed gas of Ar gas and $CO_2$ ranging from 3 to 20 vol %, or the like. In addition, the flux-cored wire according to the present embodiment does not increase the amount of spatter, even when used in combination with 100 vol % $CO_2$ gas. In addition, in the manufacturing method of a welded joint according to the present embodiment, in regard to the welding conditions such as a current and a voltage, generally used conditions may be employed.

In a case where gas shield arc welding is performed to a steel material of which temperature is less than 5° C., the steel material being one selected from the group consisting of a steel material in which the sheet thickness is 12 mm or less and Pcm is 0.36% or less, a steel material in which the sheet thickness is more than 12 mm to 25 mm and Pcm is 0.33% or less, a steel material in which the sheet thickness is more than 25 mm to 40 mm and Pcm is 0.31% or less, and a steel material in which the sheet thickness is more than 40 mm to 100 mm and Pcm is 0.29% or less, it is preferable to perform gas shield arc welding after preheating the steel material so that temperature of the steel material becomes 5° C. or higher. Even if welding is performed to the steel material, which belongs to the above-described type and of which temperature during welding is within the range, without preheating, a cold crack does not necessarily occur. In a case where non-destructive inspection such as X-ray or UST is performed after welding and there is a crack in a welded joint, a portion in which crack occurs is welded to be repaired. In addition, in a case where welding is performed to the steel material, which belongs to the above-described type and of which temperature during welding is 5° C. or higher, it is possible to certainly prevent cold crack even if preheating is omitted. Therefore, it is possible to drastically reduce cost of performing welding including weld repairing and to drastically reduce the time for performing welding.

Next, the welded joint according to the present embodiment will be described.

The welded joint according to the present embodiment is obtained by the welding method according to the present embodiment described above. Since the welded joint according to the present embodiment is manufactured by using the welding wire according to the present embodiment in which Ceq, the oxygen content, and the amounts of a slag forming agent are preferably controlled, it is possible to provide a weld metal having high strength and high toughness, the amount of diffusion hydrogen 1.0 ml/100 g or smaller, and a favorable bead shape. The shape of the welded joint is determined in accordance with use, and is not limited. The welded joint according to the present embodiment can be applied to welded joints forming a groove, such as ordinary abutment joints, corner joints, and T-joints. Therefore, the shape of the steel sheet to be welded in the manufacturing method of a welded joint according to the present embodiment needs only have at least a sheet-shaped part for forming a welded joint, so that its entirety does not have to be sheet-shaped. For example, the steel sheet includes shaped steels. In addition, the welding joint is not limited to that constituted of a plurality of steel sheets, and may be a abutment welded joint of one sheet of steel sheet formed into a predetermined shape such as a pipe shape.

The flux-cored wire according to another aspect of the present invention includes the steel sheath, and the flux that fills the inside of the steel sheath. The amount of diffusion hydrogen of a weld metal obtained by using the flux-cored wire and performing direct current gas shield arc welding under the conditions regulated by JIS Z 3118 is 1.0 ml/100 g or smaller. The weight per welding time of a spatter, which is generated when direct current gas shield arc welding is performed by using the flux-cored wire under the conditions in which wire polarity is positive, the current value is 270 A, the voltage value ranges from 29 to 32 V, the welding rate is 30 cm/min, the type of the shielding gas is 100% $CO_2$ gas, and the flow rate of the shielding gas is 25 L/min, is 5.0 g/min or smaller. The flux-cored wire according to another aspect of the present invention includes the steel sheath, and the flux that fills the inside of the steel sheath. The flux-cored wire includes, by mass % with respect to the total mass of the flux-cored wire, the amount of Ti oxides ranging from 0.10% to 2.50% and Ni ranging from 0.5% to 4.00%. The amount of diffusion hydrogen of a weld metal, which is obtained by using the flux-cored wire and performing direct current gas shield arc welding under the conditions regulated by JIS Z 3118, is 1.0 ml/100 g or smaller. The weight per welding time of a spatter, which is generated when direct current gas shield arc welding is performed by using the flux-cored wire while the wire polarity is positive, the current value is 270 A, the voltage value ranges from 29 to 32 V, the welding rate is 30 cm/min, the type of the shielding gas is 100% $CO_2$ gas, and the flow rate of the shielding gas is 25 L/min, is 5.0 g/min or smaller. Since influence of the polarity of the wire to the amount of diffusion hydrogen of a weld metal and the generation amount of spatter is small to a degree which can be ignored, the polarity may be any of positive and negative. However, it is preferable that the polarity is positive. For example, in a case where direct current gas shield arc welding is performed by using the flux-cored wire according to the present embodiment under the conditions in which the wire side is positive, the posture is downward, the current value is 270 A, the voltage value is 30 V, the welding rate is 30 cm/min, the type of the shielding gas is 100% $CO_2$ gas, and the flow rate of the shielding gas is 25 L/min, the amount of diffusion hydrogen of a weld metal can be reliably set to 1.0 ml/100 g or smaller. The flux-cored wire according to the present embodiment can obtain a weld having excellent cold-cracking resistance, so that the generation amount of spatter during welding can be drastically reduced. Particularly, in the flux-cored wire according to the present embodiment, even in a case where a high strength steel of 780 MPa or higher is welded, preheating work for preventing a cold crack can be omitted or the preheating temperature during preheating work can be lowered. In addition, in the flux-cored wire according to the present embodiment, even in a case where the shielding gas is 100% $CO_2$ gas, the generation amount of spatter can be reduced.

EXAMPLES

Next, Examples of the present invention will be described. However, the conditions in Examples are merely conditional examples employed to check feasibility and the effects of the present invention. The present invention is not limited to the conditional examples. The present invention can employ various conditions as long as the conditions do not depart from the gist of the present invention and the objects of the present invention are achieved.

By a manufacturing method including: a step of preparing a flux; a step of obtaining a U-shaped open pipe by performing forming using a forming roll while feeding a steel strip in a longitudinal direction; a step of supplying the flux to the inside of the open pipe through an opening portion of the open pipe; a step of performing abutment welding of edge surfaces of the opening portion of the open pipe, the edge surfaces facing each other; a step of performing wire drawing of a seamless pipe; and a step of annealing the flux-cored wire at temperature of 650 to 900° C. for four hours or more in the middle or after completion of the step of the wire drawing, flux-cored wires each having a wire diameter of φ1.2 mm and having seamless shape were manufactured. In addition, flux-cored wires with a slit-shaped gap, each which has wire diameter of φ1.2 mm, were manufactured by a method which is the same as the manufacturing method of a flux-cored wire having a seamless shape other than the point having a step of obtaining a pipe with a slit-shaped gap by forming the open pipe and causing the end portions of the open pipe to abut each other, instead of the step of obtaining the seamless pipe by performing abutment welding of the end portions of the open pipe. In addition, some were made into pipes having a slit-shaped gap, that is, the slit-shaped gap was not welded. These were subjected to wire drawing, and flux-cored wires having a wire diameter of φ1.2 mm were trial-manufactured. Tables 1A to 2B show the compositions of the slag components of the trial-manufactured flux-cored wires, and Tables 3A to 4B show the compositions of the alloy components. However, in all the wires, the remainder was Fe and impurities. Values which are underlined in comparative examples in Tables 1A to 4B are out of range of the present invention. In addition, units of "fluorides", "oxides", "carbonates", "CaO", "iron powder", and "chemical composition excluding fluorides, oxides, CaO, carbonates, and the iron powder" of Tables are mass % with respect to the total mass of the flux-cored wire. "Total F-equivalent value", "X-value", "Total Oxides", "α/β", and "Ceq" were calculated based on the above-described values.

In addition, as Ti oxides, Si oxides, Zr oxides, Mg oxides, and Al oxides, $TiO_2$, $SiO_2$, $ZrO_2$, $MgO$, and $Al_2O_3$ were used respectively. In Tables 1A to 2B, "carbonates" were at least one selected from the group consisting of $MgCO_3$, $Na_2CO_3$, $LiCO_3$, $CaCO_3$, $K_2CO_3$, $BaCO_3$, $FeCO_3$ and $MnCO_3$.

TABLE 1A

| NO. | CLASS | REMARKS | FLUORIDES | | | | | | | | TOTAL F-EQUIVALENT VALUE | X-VALUE |
| --- | --- | --- | --- | --- | --- | --- | --- | --- | --- | --- | --- | --- |
| | | | $CaF_2$ | $MgF_2$ | $Na_3AlF_6$ | LiF | NaF | $K_2ZrF_6$ | $BaF_2$ | $K_2SiF_6$ | | |
| 1 | EXAMPLES | | 0.44 | | | | | | | | 0.27 | 0.44 |
| 2 | | | 4.20 | | | | | | | | 2.56 | 4.20 |
| 3 | | | | | 0.47 | | | | | | 0.25 | 0.47 |
| 4 | | | | | 4.40 | | | | | | 2.38 | 4.40 |
| 5 | | | | | | 0.43 | | | | | 0.31 | 0.65 |
| 6 | | | | | | 3.01 | | | | | 2.20 | 4.52 |
| 7 | | | | | | | 0.62 | | | | 0.28 | 0.62 |
| 8 | | | | | | | 3.20 | | | | 1.44 | 3.20 |
| 9 | | | | | | | | 0.63 | | | 0.25 | 0.95 |
| 10 | | | | | | | | 2.77 | | | 1.11 | 4.16 |
| 11 | | | | | | | | | 1.47 | | 0.32 | 2.21 |
| 12 | | | | | | | | | 3.04 | | 0.66 | 4.56 |
| 13 | | | | | | | | | | 0.57 | 0.30 | 0.86 |
| 14 | | | | | | | | | | 2.93 | 1.52 | 4.40 |
| 15 | | | 0.42 | 1.10 | | | | | | | 0.88 | 2.57 |
| 16 | | | 0.32 | | 1.20 | | | | | | 0.80 | 2.32 |
| 17 | | | 0.40 | | | | | 1.80 | | | 0.92 | 4.10 |
| 18 | | | 0.23 | | | | | | | 1.50 | 0.89 | 3.06 |
| 19 | | | | 1.02 | 1.38 | | | | | | 1.37 | 2.40 |
| 20 | | | | | | 1.20 | | | | | 0.88 | 1.80 |
| 21 | | | | | 1.80 | | | 0.80 | | | 1.29 | 3.00 |
| 22 | | | | | 1.10 | | | | 0.80 | | 1.01 | 2.30 |
| 23 | | | | 0.70 | | | | 1.80 | | | 1.15 | 3.40 |
| 24 | | WITH GAP | | | | | | 0.40 | 1.60 | | 0.99 | 3.00 |
| 25 | | | | 0.40 | 0.60 | | | | 0.90 | | 1.04 | 2.35 |
| 26 | | | | | 1.30 | | | | | | 0.70 | 1.30 |
| 27 | | | | | 1.90 | | | | | | 1.03 | 1.90 |
| 28 | | | | 0.91 | | | 1.90 | | | | 1.41 | 2.81 |
| 29 | | | | 1.96 | | | | | | | 1.20 | 1.96 |
| 30 | | | | 0.51 | | | | | | | 0.31 | 0.51 |
| 31 | | | | 1.70 | | | | | | | 1.04 | 1.70 |
| 32 | | WITH GAP | 1.25 | | | | | | | | 0.76 | 1.25 |
| 33 | | PTFE COATED | | | 1.48 | | | | | | 0.80 | 1.48 |
| 34 | | | | | 0.89 | | | | 0.11 | | 0.54 | 1.06 |
| 35 | | | | | | | 0.54 | | | | 0.24 | 0.54 |
| 36 | | | | | 1.60 | | | | | | 0.87 | 1.60 |
| 37 | | | | | 1.43 | | | | | | 0.77 | 1.43 |
| 38 | | | | | | 1.58 | | | | | 1.15 | 2.37 |

TABLE 1A-continued

| NO. | CLASS | REMARKS | CaF$_2$ | MgF$_2$ | Na$_3$AlF$_6$ | LiF | NaF | K$_2$ZrF$_6$ | BaF$_2$ | K$_2$SiF$_6$ | TOTAL F-EQUIVALENT VALUE | X-VALUE |
|---|---|---|---|---|---|---|---|---|---|---|---|---|
| 39 | | | | | | 1.02 | 0.42 | | | | 0.94 | 1.96 |
| 40 | | | | | | | 1.44 | | | | 0.58 | 2.16 |
| 41 | | | | | | 1.84 | | | | | 1.34 | 2.76 |
| 42 | | PTFE COATED | | | | 1.85 | | | | | 1.35 | 2.78 |
| 43 | | | | | | | 1.29 | | | | 0.52 | 1.94 |
| 44 | | | | | | | 1.83 | | | | 0.73 | 2.74 |
| 45 | | | | | | | 1.32 | | | | 0.53 | 1.98 |
| 46 | | | | | | | 1.65 | | | | 0.66 | 2.47 |
| 47 | | | | | | | 1.92 | | | | 0.77 | 2.88 |
| 48 | | | | | | | | | 1.82 | | 0.95 | 2.73 |
| 49 | | | | | | | | | 1.00 | | 0.52 | 1.49 |
| 50 | | | | | | | 0.33 | | 0.98 | | 0.66 | 1.80 |
| 51 | | | | | | | | | 1.86 | | 0.97 | 2.79 |

TABLE 1B

| NO. | CLASS | REMARKS | CaF$_2$ | MgF$_2$ | Na$_3$AlF$_6$ | LiF | NaF | K$_2$ZrF$_6$ | BaF$_2$ | K$_2$SiF$_6$ | TOTAL F-EQUIVALENT VALUE | X-VALUE |
|---|---|---|---|---|---|---|---|---|---|---|---|---|
| 52 | EXAMPLES | | | | | 0.14 | | | | 0.96 | 0.60 | 1.64 |
| 53 | | | 0.22 | | | | | | | 0.60 | 0.42 | 1.67 |
| 54 | | | | 2.10 | | | | 0.31 | | | 1.41 | 2.57 |
| 55 | | | | | | 1.10 | | | | 0.14 | 0.67 | 1.31 |
| 56 | | | 0.23 | | | | 0.89 | | | | 0.76 | 2.14 |
| 57 | | | | | | | | 0.78 | | 0.45 | 0.55 | 1.85 |
| 58 | | | | | | 1.21 | | | | 0.11 | 0.71 | 1.38 |
| 59 | | | | | | | 0.79 | | | 0.14 | 0.65 | 1.40 |
| 60 | | | | | | 1.11 | | 0.13 | | | 0.65 | 1.31 |
| 61 | | | | | | 1.02 | | | | | 0.55 | 1.02 |
| 62 | | | | | | 1.23 | | | | | 0.66 | 1.23 |
| 63 | COMPARATIVE | | <u>1.8</u> | | | | | | | | 0.88 | 6.30 |
| 64 | EXAMPLES | | | 0.21 | | | | | | | <u>0.13</u> | 0.21 |
| 65 | | | | 5.70 | | | | | | | 3.48 | <u>5.70</u> |
| 66 | | | | | | 0.31 | | | | | <u>0.17</u> | 0.31 |
| 67 | | | | | | 6.20 | | | | | 3.35 | <u>6.20</u> |
| 68 | | | | | | | 0.17 | | | | <u>0.12</u> | 0.26 |
| 69 | | | | | | | 4.50 | | | | 3.29 | <u>6.75</u> |
| 70 | | | 0.1 | | | 0.16 | | | | | <u>0.14</u> | 0.51 |
| 71 | | | <u>1.3</u> | | | | | 1.30 | | | 1.16 | <u>6.50</u> |
| 72 | | | 0.1 | | | 0.50 | 1.00 | | | | 0.77 | 1.85 |
| 73 | | WITH GAP | | | | 1.61 | | | | | 1.18 | 2.42 |
| 74 | | | | | | | 1.50 | | | | 0.60 | 2.25 |
| 75 | | PTFE COATED | | | | | | | | 1.80 | 0.94 | 2.70 |
| 76 | | | | | 2.10 | | | | | | 1.13 | 2.10 |
| 77 | | | | | 1.42 | | | | | | 0.77 | 1.42 |
| 78 | | | | | | | | | 2.63 | | 0.57 | 3.95 |
| 79 | | | | | 1.61 | | | | | | 0.87 | 1.61 |
| 80 | | | | | | | 4.6 | | | | 2.07 | 4.60 |
| 81 | | WITH GAP | | | 1.23 | | | | | | 0.75 | 1.23 |
| 82 | | | | | 1.47 | | | | | | 0.90 | 1.47 |
| 83 | | | | | 1.91 | | | | | | 1.17 | 1.91 |
| 84 | | PTFE COATED | | | | | | 1.42 | | | 0.57 | 2.13 |
| 85 | | | | | | | | | 2.61 | | 0.57 | 3.92 |
| 86 | | | | | | | | 2.04 | | | 0.82 | 3.06 |
| 87 | | | | | | | | 2.49 | | | 1.00 | 3.74 |
| 88 | | | | | | | | | | 1.32 | 0.69 | 1.98 |
| 89 | | | | | | | | | | 1.57 | 0.82 | 2.36 |
| 90 | | | | | | | 0.78 | | | 1.98 | 1.38 | 3.75 |
| 91 | | | | | | | | | | 2.05 | 1.07 | 3.08 |
| 92 | | | | | | 1.04 | | | | 0.15 | 0.64 | 1.27 |
| 93 | | | | | | 3.47 | | | | 0.15 | 1.95 | 3.70 |
| 94 | | | | | | 1.02 | | 0.14 | | | 0.61 | 1.23 |
| 95 | | | | | 1.07 | | 0.15 | | | | 0.71 | 1.30 |
| 96 | | | | | 2.9 | | 0.14 | | | | 1.83 | 3.11 |
| 97 | | | | | | | | 0.62 | 0.62 | | 0.57 | 1.86 |
| 98 | | | | | | | | 0.92 | 0.88 | | 0.83 | 2.70 |
| 99 | | | | | | 1.66 | | | | | 0.90 | 1.66 |
| 100 | | | | | | 1.03 | | | | 0.14 | 0.63 | 1.24 |

TABLE 2A

| NO. | CLASS | Ti OXIDES | Si OXIDES | Zr OXIDES | Mg OXIDES | Al OXIDES | TOTAL OXIDES | α/β | CaO | CARBONATES | IRON POWDER |
|---|---|---|---|---|---|---|---|---|---|---|---|
| 1 | EXAMPLES | 0.42 | 0.48 | 0.50 | 0.21 | | 1.61 | 0.17 | | | |
| 2 | | 0.51 | 0.22 | | | 0.01 | 0.74 | 3.45 | | | |
| 3 | | 0.54 | 0.28 | | | | 0.82 | 0.31 | | | |
| 4 | | 1.13 | 0.39 | | 0.10 | | 1.62 | 1.47 | | | |
| 5 | | 0.64 | 0.26 | | | | 0.90 | 0.35 | | 0.67 ($BaCO_3$) | |
| 6 | | 0.80 | 0.44 | | | | 1.24 | 1.77 | | | |
| 7 | | 0.23 | | | 0.12 | | 0.35 | 0.80 | | | |
| 8 | | 0.84 | | 0.10 | | | 0.94 | 1.53 | | | |
| 9 | | 0.94 | 0.45 | | | 0.02 | 1.41 | 0.18 | | | |
| 10 | | 1.21 | 0.42 | 0.50 | 0.20 | | 2.33 | 0.48 | | | |
| 11 | | 1.19 | | | | | 1.19 | 0.27 | 0.05 | | |
| 12 | | 1.01 | 0.33 | | | | 1.34 | 0.49 | | | |
| 13 | | 1.11 | | 0.22 | 0.21 | | 1.54 | 0.19 | | | |
| 14 | | 0.68 | 0.34 | | | 0.03 | 1.05 | 1.46 | | | |
| 15 | | 0.54 | 0.35 | 0.50 | 0.24 | | 1.63 | 0.54 | | 0.65 ($MgCO_3$) | |
| 16 | | 1.80 | 0.27 | | | | 2.08 | 0.39 | | | |
| 17 | | 1.56 | 0.39 | | 0.11 | | 2.06 | 0.45 | | | |
| 18 | | 1.71 | 0.30 | | | | 2.01 | 0.44 | | | |
| 19 | | 1.32 | 0.39 | 0.10 | | | 1.81 | 0.76 | | | |
| 20 | | 1.50 | 0.39 | | 0.22 | | 2.11 | 0.41 | | | |
| 21 | | 2.22 | | | 0.25 | | 2.47 | 0.52 | | | |
| 22 | | 0.81 | 0.26 | | | 0.01 | 1.08 | 0.93 | | 0.39 ($FeCO_3$) | 3.7 |
| 23 | | 1.10 | 0.33 | | | | 1.43 | 0.80 | | | |
| 24 | | 0.60 | 0.31 | 0.50 | | | 1.41 | 0.70 | | | |
| 25 | | 1.80 | 0.35 | | 0.21 | | 2.36 | 0.44 | | | |
| 26 | | 0.30 | 0.40 | | | | 0.70 | 1.00 | | | |
| 27 | | 2.41 | 0.32 | | | | 2.73 | 0.38 | | | |
| 28 | | 1.45 | | | | | 1.45 | 0.97 | | 2.41 ($Na_2CO_3$) | |
| 29 | | 1.32 | 0.34 | 0.52 | | | 2.18 | 0.55 | | | |
| 30 | | 0.87 | 0.36 | | | | 1.23 | 0.25 | | | |
| 31 | | 0.64 | 0.31 | | | | 0.95 | 1.09 | | | |
| 32 | | 2.32 | 0.44 | | | | 2.76 | 0.28 | | 0.80 ($Na_2CO_3$) + 0.72($CaCO_3$) | |
| 33 | | 0.99 | 0.99 | | | 0.08 | 2.06 | 0.39 | | | |
| 34 | | 2.45 | | 0.24 | 0.25 | | 2.94 | 0.18 | | | 6.2 |
| 35 | | 0.27 | | 0.22 | | | 0.49 | 0.50 | | | |
| 36 | | 0.87 | 0.11 | | | | 0.98 | 0.88 | | 0.80 ($Na_2CO_3$) | |
| 37 | | 0.99 | 0.23 | | | | 1.22 | 0.63 | | | |
| 38 | | 1.24 | 0.49 | 0.52 | | | 2.25 | 0.51 | | | |
| 39 | | 1.55 | 0.37 | | | 0.09 | 2.01 | 0.47 | | | |
| 40 | | 2.10 | 0.47 | | | | 2.57 | 0.22 | | | |
| 41 | | 1.22 | 0.84 | | | | 2.06 | 0.65 | 0.12 | 0.45 ($K_2CO_3$) | |
| 42 | | 1.09 | | | | | 1.09 | 1.24 | | | |
| 43 | | 1.68 | | | | | 1.68 | 0.31 | | | |
| 44 | | 1.42 | 0.54 | | | | 1.96 | 0.37 | | | |
| 45 | | 1.21 | 0.31 | | 0.27 | | 1.79 | 0.29 | | | |
| 46 | | 1.99 | 0.23 | | | | 2.22 | 0.30 | | | |
| 47 | | 1.36 | 0.67 | 0.13 | | | 2.16 | 0.36 | | | |
| 48 | | 1.42 | 0.44 | | | 0.31 | 2.17 | 0.44 | | 0.34 ($CaCO_3$) | |
| 49 | | 1.09 | 0.21 | | | | 1.30 | 0.40 | | | |
| 50 | | 0.41 | 0.36 | | | | 0.77 | 0.86 | | | |
| 51 | | 0.69 | 0.47 | 0.24 | | | 1.40 | 0.69 | | | |

TABLE 2B

| NO. | CLASS | Ti OXIDES | Si OXIDES | Zr OXIDES | Mg OXIDES | Al OXIDES | TOTAL OXIDES | α/β | CaO | CARBONATES | IRON POWDER |
|---|---|---|---|---|---|---|---|---|---|---|---|
| 52 | EXAMPLES | 0.70 | 0.39 | | | | 1.09 | 0.55 | | 1.16($MnCO_3$) | |
| 53 | | 1.01 | 0.31 | | | | 1.32 | 0.32 | | | |
| 54 | | 1.09 | 0.38 | | | | 1.47 | 0.96 | | | |
| 55 | | 1.88 | | | | | 1.88 | 0.35 | | | 4.8 |
| 56 | | 1.79 | | | | | 1.79 | 0.43 | 0.11 | | |
| 57 | | 0.61 | 0.54 | | 0.28 | | 1.43 | 0.38 | | | |
| 58 | | 2.04 | 0.56 | | | | 2.60 | 0.27 | | | |
| 59 | | 0.87 | 0.54 | | | | 1.41 | 0.46 | | 1.77($LiCO_3$) | |
| 60 | | 0.32 | | | | | 0.32 | 2.04 | | | |
| 61 | | 0.47 | | | | | 0.47 | 1.17 | | | |
| 62 | | 0.88 | | | | | 0.88 | 0.75 | | | |

TABLE 2B-continued

| | | OXIDES | | | | | | | | | |
|---|---|---|---|---|---|---|---|---|---|---|---|
| NO. | CLASS | Ti OXIDES | Si OXIDES | Zr OXIDES | Mg OXIDES | Al OXIDES | TOTAL OXIDES | α/β | CaO | CARBONATES | IRON POWDER |
| 63 | COMPARATIVE | 0.41 | 0.50 | | | | 0.91 | 0.97 | | | |
| 64 | EXAMPLES | 0.69 | 0.35 | | | 0.04 | 1.08 | 0.12 | | | |
| 65 | | 1.65 | 0.38 | | 0.14 | | 2.17 | 1.60 | | | |
| 66 | | 0.74 | 0.20 | | | | 0.94 | 0.18 | | | |
| 67 | | 0.50 | 0.21 | 0.30 | | | 1.01 | 3.31 | | | |
| 68 | | 1.99 | 0.46 | | | | 2.45 | 0.05 | 0.30 | | |
| 69 | | 0.42 | 0.36 | | 0.24 | | 1.02 | 3.21 | | | |
| 70 | | 1.65 | 0.47 | | | 0.02 | 2.14 | 0.06 | | | |
| 71 | | 2.31 | 0.23 | | | | 2.54 | 0.46 | | | |
| 72 | | 0.00 | 0.21 | | 0.25 | | 0.46 | 1.68 | | | |
| 73 | | 2.70 | 0.23 | | | | 2.93 | 0.40 | | | |
| 74 | | 2.20 | 0.65 | 0.50 | | 0.40 | 3.75 | 0.16 | | | |
| 75 | | 0.25 | | | | | 0.25 | 3.74 | | | |
| 76 | | 0.35 | 0.24 | | | | 0.59 | 1.91 | | 3.9(Na$_2$CO$_3$) | |
| 77 | | 0.91 | 0.17 | | | | 1.08 | 0.71 | | | |
| 78 | | 0.64 | 0.36 | | | | 1.00 | 0.57 | | | |
| 79 | | 1.52 | 0.37 | | 0.24 | | 2.13 | 0.41 | | | |
| 80 | | 1.78 | | | | | 1.78 | 1.16 | | | |
| 81 | | 1.59 | | | | | 1.59 | 0.47 | | | |
| 82 | | 1.34 | 0.54 | | | | 1.88 | 0.48 | | | |
| 83 | | 1.22 | 0.31 | | 0.33 | | 1.86 | 0.63 | | | |
| 84 | | 1.67 | 0.27 | | | | 1.94 | 0.29 | | | |
| 85 | | 1.97 | 0.22 | | | | 2.19 | 0.26 | | | |
| 86 | | 1.47 | 0.98 | | | 0.31 | 2.76 | 0.30 | | | |
| 87 | | 1.74 | | 0.01 | | | 1.75 | 0.57 | | | |
| 88 | | 1.65 | | | | | 1.65 | 0.42 | | | 2.9 |
| 89 | | 1.22 | 0.34 | | 0.33 | | 1.89 | 0.43 | | | |
| 90 | | 0.71 | 0.31 | | | | 1.02 | 1.35 | | | |
| 91 | | 0.22 | 0.38 | | | | 0.60 | 1.78 | | | |
| 92 | | 0.99 | | | 0.41 | | 1.40 | 0.46 | | | |
| 93 | | 1.58 | 0.91 | | | | 2.49 | 0.78 | | | |
| 94 | | 1.59 | 0.21 | | | 0.35 | 2.15 | 0.28 | | | |
| 95 | | 1.44 | 0.34 | | | | 1.78 | 0.40 | 0.05 | | |
| 96 | | 1.66 | 0.37 | | | | 2.03 | 0.90 | | | |
| 97 | | 0.77 | 0.37 | | 0.23 | | 1.37 | 0.42 | | | |
| 98 | | 1.58 | 0.36 | | 0.31 | | 2.25 | 0.37 | | | |
| 99 | | 1.20 | 0.46 | | | | 1.66 | 0.54 | | | |
| 100 | | 0.92 | 0.22 | | 0.31 | | 1.45 | 0.43 | | | |

TABLE 3A

| | | CHEMICAL COMPOSITION EXCLUDING FLUORIDES, OXIDES, CAO, CARBONATES, AND IRON POWDER (REMAINDER: FE AND IMPURITIES) | | | | | | | |
|---|---|---|---|---|---|---|---|---|---|
| NO. | CLASS | C | Si | Mn | P | S | Ni | Al | Mo |
| 1 | EXAMPLES | 0.075 | 0.73 | 1.75 | 0.011 | 0.005 | 0.62 | 0.057 | 0.81 |
| 2 | | 0.065 | 0.86 | 2.21 | 0.013 | 0.007 | 1.78 | 0.005 | 0.42 |
| 3 | | 0.080 | 0.52 | 1.87 | 0.014 | 0.010 | 1.85 | 0.012 | 0.37 |
| 4 | | 0.073 | 0.78 | 1.84 | 0.011 | 0.006 | 3.45 | 0.019 | 0.58 |
| 5 | | 0.060 | 0.94 | 1.99 | 0.009 | 0.003 | 0.72 | 0.026 | 0.66 |
| 6 | | 0.066 | 0.48 | 1.93 | 0.011 | 0.007 | 2.78 | 0.002 | 0.75 |
| 7 | | 0.072 | 0.70 | 1.88 | 0.011 | 0.006 | 1.80 | 0.030 | 0.40 |
| 8 | | 0.032 | 0.64 | 2.10 | 0.010 | 0.007 | 1.48 | 0.020 | 0.23 |
| 9 | | 0.081 | 0.69 | 2.29 | 0.012 | 0.007 | 2.01 | 0.018 | 0.63 |
| 10 | | 0.071 | 0.94 | 2.13 | 0.014 | 0.004 | 2.52 | 0.099 | 0.30 |
| 11 | | 0.051 | 0.71 | 1.89 | 0.012 | 0.006 | 2.40 | 0.020 | 0.61 |
| 12 | | 0.069 | 0.45 | 2.30 | 0.010 | 0.011 | 1.40 | 0.061 | 0.10 |
| 13 | | 0.074 | 0.76 | 2.33 | 0.010 | 0.009 | 1.38 | 0.011 | 0.68 |
| 14 | | 0.083 | 0.41 | 1.80 | 0.011 | 0.008 | 1.83 | 0.051 | 0.52 |
| 15 | | 0.072 | 0.76 | 1.66 | 0.015 | 0.009 | 2.11 | 0.074 | 0.36 |
| 16 | | 0.055 | 0.52 | 2.41 | 0.009 | 0.007 | 2.33 | 0.007 | 0.17 |
| 17 | | 0.053 | 0.82 | 2.04 | 0.015 | 0.003 | 1.34 | 0.020 | 0.83 |
| 18 | | 0.085 | 0.75 | 2.32 | 0.013 | 0.009 | 1.80 | 0.011 | 0.26 |
| 19 | | 0.065 | 0.40 | 2.25 | 0.013 | 0.005 | 2.31 | 0.027 | 0.84 |
| 20 | | 0.062 | 0.55 | 1.87 | 0.014 | 0.007 | 0.64 | 0.153 | 0.32 |
| 21 | | 0.056 | 0.70 | 1.70 | 0.008 | 0.009 | 2.43 | 0.068 | 0.19 |
| 22 | | 0.057 | 0.40 | 2.25 | 0.014 | 0.009 | 1.59 | 0.027 | 0.29 |
| 23 | | 0.057 | 0.81 | 2.20 | 0.011 | 0.004 | 2.88 | 0.004 | 0.46 |
| 24 | | 0.068 | 0.74 | 2.12 | 0.015 | 0.008 | 3.11 | 0.011 | 0.20 |
| 25 | | 0.045 | 0.67 | 1.86 | 0.012 | 0.010 | 1.53 | 0.022 | 0.99 |
| 26 | | 0.045 | 0.81 | 2.13 | 0.012 | 0.007 | 1.59 | 0.024 | 0.61 |
| 27 | | 0.015 | 0.86 | 2.21 | 0.009 | 0.004 | 0.64 | 0.008 | 0.56 |
| 28 | | 0.093 | 0.62 | 2.02 | 0.010 | 0.005 | 1.66 | 0.027 | 0.53 |
| 29 | | 0.181 | 0.56 | 1.82 | 0.010 | 0.009 | 1.91 | 0.020 | 0.37 |
| 30 | | 0.058 | 0.34 | 2.01 | 0.012 | 0.004 | 2.92 | 0.053 | 0.74 |
| 31 | | 0.052 | 0.72 | 2.40 | 0.014 | 0.006 | 1.23 | 0.074 | 0.22 |
| 32 | | 0.075 | 1.45 | 1.70 | 0.016 | 0.004 | 1.88 | 0.067 | 0.15 |
| 33 | | 0.087 | 0.93 | 1.11 | 0.009 | 0.007 | 2.41 | 0.013 | 0.91 |
| 34 | | 0.057 | 0.57 | 2.20 | 0.010 | 0.010 | 1.26 | 0.056 | 0.71 |
| 35 | | 0.079 | 0.63 | 3.43 | 0.015 | 0.007 | 2.10 | 0.090 | 0.57 |
| 36 | | 0.057 | 0.42 | 1.46 | 0.009 | 0.014 | 0.72 | 0.022 | 0.47 |
| 37 | | 0.057 | 0.92 | 1.44 | 0.006 | 0.005 | 1.71 | 0.090 | 0.46 |
| 38 | | 0.066 | 0.63 | 2.00 | 0.008 | 0.016 | 3.44 | 0.030 | 0.17 |
| 39 | | 0.057 | 0.75 | 2.19 | 0.011 | 0.011 | 3.32 | 0.005 | 0.92 |
| 40 | | 0.076 | 0.94 | 2.04 | 0.015 | 0.007 | 1.35 | 0.105 | 0.56 |

TABLE 3A-continued

CHEMICAL COMPOSITION EXCLUDING FLUORIDES, OXIDES, CAO, CARBONATES, AND IRON POWDER (REMAINDER: FE AND IMPURITIES)

| NO. | CLASS | C | Si | Mn | P | S | Ni | Al | Mo |
|---|---|---|---|---|---|---|---|---|---|
| 41 | | 0.058 | 0.80 | 2.47 | 0.006 | 0.013 | 2.07 | 0.280 | 0.54 |
| 42 | | 0.065 | 0.35 | 1.88 | 0.015 | 0.014 | 3.19 | 0.015 | 0.21 |
| 43 | | 0.061 | 0.79 | 1.73 | 0.016 | 0.009 | 2.51 | 0.003 | 0.89 |
| 44 | | 0.060 | 0.40 | 2.40 | 0.011 | 0.015 | 1.05 | 0.027 | 1.88 |
| 45 | | 0.060 | 0.34 | 1.79 | 0.006 | 0.006 | 2.10 | 0.072 | 0.42 |
| 46 | | 0.058 | 0.34 | 2.09 | 0.008 | 0.013 | 3.42 | 0.090 | 0.39 |

TABLE 3A-continued

CHEMICAL COMPOSITION EXCLUDING FLUORIDES, OXIDES, CAO, CARBONATES, AND IRON POWDER (REMAINDER: FE AND IMPURITIES)

| NO. | CLASS | C | Si | Mn | P | S | Ni | Al | Mo |
|---|---|---|---|---|---|---|---|---|---|
| 47 | | 0.063 | 0.88 | 1.87 | 0.012 | 0.007 | 1.96 | 0.037 | 0.77 |
| 48 | | 0.064 | 0.71 | 1.77 | 0.010 | 0.011 | 1.37 | 0.066 | 0.60 |
| 49 | | 0.067 | 0.67 | 2.17 | 0.013 | 0.007 | 2.06 | 0.025 | 0.60 |
| 50 | | 0.057 | 0.77 | 2.28 | 0.013 | 0.014 | 3.04 | 0.053 | 0.23 |
| 51 | | 0.075 | 0.35 | 1.96 | 0.013 | 0.011 | 1.15 | 0.076 | 0.60 |

TABLE 3B

CHEMICAL COMPOSITION EXCLUDING FLUORIDES, OXIDES, CAO, CARBONATES, AND IRON POWDER (REMAINDER: FE AND IMPURITIES)

| NO. | CLASS | C | Si | Mn | P | S | Ni | Al | Mo |
|---|---|---|---|---|---|---|---|---|---|
| 52 | EXAMPLES | 0.059 | 0.53 | 2.05 | 0.007 | 0.005 | 2.69 | 0.080 | 0.35 |
| 53 | | 0.056 | 0.54 | 1.59 | 0.009 | 0.007 | 2.97 | 0.025 | 0.51 |
| 54 | | 0.077 | 0.33 | 1.80 | 0.009 | 0.006 | 0.93 | 0.029 | 0.32 |
| 55 | | 0.068 | 0.93 | 2.22 | 0.006 | 0.015 | 2.67 | 0.082 | 0.48 |
| 56 | | 0.076 | 0.72 | 2.01 | 0.007 | 0.012 | 0.69 | 0.074 | 0.53 |
| 57 | | 0.032 | 0.81 | 1.83 | 0.005 | 0.010 | 1.63 | 0.021 | 0.23 |
| 58 | | 0.023 | 0.71 | 1.69 | 0.006 | 0.006 | 1.51 | 0.003 | 0.43 |
| 59 | | 0.073 | 0.70 | 1.82 | 0.007 | 0.007 | 0.94 | 0.082 | 0.31 |
| 60 | | 0.076 | 0.94 | 2.06 | 0.007 | 0.010 | 2.51 | 0.005 | 0.19 |
| 61 | | 0.071 | 0.60 | 2.43 | 0.008 | 0.006 | 2.81 | 0.077 | 0.77 |
| 62 | | 0.062 | 0.84 | 2.16 | 0.013 | 0.005 | 2.05 | 0.077 | 0.30 |
| 63 | COMPARATIVE | 0.063 | 0.89 | 2.43 | 0.008 | 0.006 | 1.64 | 0.067 | 0.89 |
| 64 | EXAMPLES | 0.057 | 0.39 | 1.90 | 0.007 | 0.014 | 3.32 | 0.046 | 0.30 |
| 65 | | 0.075 | 0.83 | 1.80 | 0.012 | 0.011 | 2.38 | 0.078 | 0.54 |
| 66 | | 0.059 | 0.80 | 2.27 | 0.008 | 0.010 | 1.92 | 0.077 | 0.41 |
| 67 | | 0.066 | 0.73 | 2.38 | 0.006 | 0.009 | 0.97 | 0.007 | 0.51 |
| 68 | | 0.066 | 0.41 | 2.18 | 0.014 | 0.011 | 1.43 | 0.025 | 0.94 |
| 69 | | 0.056 | 0.80 | 2.20 | 0.013 | 0.007 | 1.87 | 0.009 | 0.57 |
| 70 | | 0.068 | 0.69 | 1.82 | 0.009 | 0.007 | 2.34 | 0.090 | 0.84 |
| 71 | | 0.080 | 0.60 | 1.95 | 0.013 | 0.015 | 3.37 | 0.028 | 0.70 |
| 72 | | 0.075 | 0.90 | 1.91 | 0.011 | 0.005 | 2.87 | 0.090 | 0.55 |
| 73 | | 0.083 | 0.57 | 2.10 | 0.008 | 0.009 | 1.42 | 0.077 | 0.31 |
| 74 | | 0.067 | 0.44 | 1.77 | 0.009 | 0.010 | 1.03 | 0.020 | 0.59 |
| 75 | | 0.060 | 0.82 | 2.41 | 0.006 | 0.013 | 2.50 | 0.084 | 0.54 |
| 76 | | 0.058 | 0.94 | 1.81 | 0.014 | 0.015 | 2.21 | 0.039 | 0.22 |
| 77 | | <u>0.210</u> | 0.47 | 2.21 | 0.006 | 0.006 | 2.47 | 0.038 | 0.22 |
| 78 | | 0.044 | <u>0.14</u> | 1.76 | 0.009 | 0.015 | 2.81 | 0.045 | 0.65 |
| 79 | | 0.062 | <u>1.60</u> | 2.40 | 0.015 | 0.007 | 1.58 | 0.051 | 0.65 |
| 80 | | 0.070 | 1.20 | <u>0.51</u> | 0.011 | 0.009 | 1.57 | 0.076 | 0.85 |
| 81 | | 0.076 | 0.89 | <u>3.70</u> | 0.007 | 0.014 | 2.13 | 0.064 | 0.77 |
| 82 | | 0.060 | 0.49 | 2.18 | <u>0.051</u> | 0.007 | 3.18 | 0.036 | 0.40 |
| 83 | | 0.063 | 0.64 | 1.37 | 0.010 | <u>0.039</u> | 1.53 | 0.022 | 0.40 |
| 84 | | 0.073 | 0.43 | 1.44 | 0.013 | 0.006 | <u>0.32</u> | 0.026 | 0.76 |
| 85 | | 0.075 | 0.73 | 1.86 | 0.011 | 0.012 | <u>4.60</u> | 0.006 | 0.73 |
| 86 | | 0.077 | 0.72 | 2.12 | 0.010 | 0.013 | 3.45 | <u>0.000</u> | 0.63 |
| 87 | | 0.060 | 0.67 | 1.72 | 0.011 | 0.006 | 2.01 | <u>0.380</u> | 0.83 |
| 88 | | 0.057 | 0.73 | 2.30 | 0.010 | 0.016 | 0.98 | 0.078 | <u>0.05</u> |
| 89 | | 0.075 | 0.45 | 2.34 | 0.009 | 0.007 | 0.73 | 0.014 | <u>2.16</u> |
| 90 | | 0.074 | 0.55 | 2.36 | 0.009 | 0.010 | 1.63 | 0.030 | 0.91 |
| 91 | | 0.066 | 0.39 | 1.50 | 0.012 | 0.009 | 2.32 | 0.007 | 0.93 |
| 92 | | 0.065 | 0.90 | 2.45 | 0.012 | 0.007 | 1.62 | 0.020 | 0.31 |
| 93 | | 0.065 | 0.81 | 2.64 | 0.007 | 0.005 | 0.83 | 0.051 | 0.67 |
| 94 | | 0.057 | 0.65 | 2.31 | 0.005 | 0.007 | 1.72 | 0.098 | 0.29 |
| 95 | | 0.068 | 0.71 | 2.25 | 0.007 | 0.006 | 2.74 | 0.074 | 0.88 |
| 96 | | 0.025 | 0.63 | 1.45 | 0.006 | 0.008 | 2.11 | 0.031 | 0.91 |
| 97 | | 0.069 | 0.60 | 2.13 | 0.006 | 0.011 | 2.01 | 0.049 | 0.28 |
| 98 | | 0.064 | 0.45 | 2.21 | 0.006 | 0.007 | 0.92 | 0.036 | 0.37 |
| 99 | | 0.064 | 0.83 | 1.23 | 0.007 | 0.005 | 1.15 | 0.028 | 0.13 |
| 100 | | 0.080 | 1.32 | 3.24 | 0.010 | 0.010 | 3.39 | 0.037 | 0.87 |

TABLE 4A

| | | CHEMICAL COMPOSITION EXCLUDING FLUORIDES, OXIDES, CAO, CARBONATES, AND IRON POWDER (REMAINDER: FE AND IMPURITIES) | | | | | | | | | | | Mg + |
|---|---|---|---|---|---|---|---|---|---|---|---|---|---|
| NO. | CLASS | Cu | Cr | V | Ti | Nb | B | Bi | Mg | Ca | REM | Ceq | 10 × Al |
| 1 | EXAMPLES | | | | 0.20 | | 0.0068 | | | | | 0.62 | 0.57 |
| 2 | | | | | 0.14 | | 0.0043 | | | | | 0.62 | 0.05 |
| 3 | | | 0.04 | | 0.14 | | | | | | | 0.56 | 0.12 |
| 4 | | | | | 0.09 | | 0.0023 | | | | | 0.64 | 0.19 |
| 5 | | | | 0.01 | 0.07 | | 0.0075 | | | | | 0.62 | 0.26 |
| 6 | | | 1.21 | | 0.21 | | | | 0.04 | | | 0.91 | 0.06 |
| 7 | | | | | 0.11 | | | | 0.05 | | | 0.56 | 0.35 |
| 8 | | | | | 0.09 | | | | | 0.02 | | 0.50 | 0.20 |
| 9 | | | | | 0.04 | | 0.0048 | | | | | 0.70 | 0.18 |
| 10 | | 0.21 | | | 0.22 | | 0.0037 | | 0.07 | | | 0.60 | 1.06 |
| 11 | | | | | 0.18 | | | | | | | 0.61 | 0.20 |
| 12 | | | | | 0.16 | | | | | | | 0.53 | 0.61 |
| 13 | | | | | 0.15 | | 0.0046 | | | | | 0.70 | 0.11 |
| 14 | | | | | 0.10 | | 0.0044 | | | | | 0.58 | 0.51 |
| 15 | | | | | 0.18 | | | | | | | 0.52 | 0.74 |
| 16 | | 0.47 | 0.09 | | 0.03 | | | | | | | 0.60 | 0.07 |
| 17 | | | | 0.005 | 0.08 | | 0.0074 | | | | | 0.67 | 0.20 |
| 18 | | | 1.02 | | 0.08 | | 0.0056 | | | 0.03 | | 0.82 | 0.11 |
| 19 | | | | | 0.18 | | | | | | | 0.72 | 0.27 |
| 20 | | 0.30 | | | 0.16 | | 0.0033 | | | | | 0.49 | 1.53 |
| 21 | | | 1.22 | | 0.22 | | 0.0074 | | 0.05 | | | 0.72 | 0.73 |
| 22 | | | | | 0.11 | | 0.0051 | | | | | 0.56 | 0.27 |
| 23 | | | 0.07 | | 0.19 | | 0.0051 | | | | | 0.66 | 0.04 |
| 24 | | | | | 0.15 | | | 0.0085 | | | | 0.58 | 0.11 |
| 25 | | | | | 0.03 | | 0.0032 | | | | | 0.67 | 0.22 |
| 26 | | 0.37 | | | 0.16 | | 0.0043 | | | | | 0.62 | 0.24 |
| 27 | | | 0.14 | | 0.17 | | 0.0060 | | | | | 0.60 | 0.08 |
| 28 | | | | | 0.22 | | 0.0054 | | | | | 0.63 | 0.27 |
| 29 | | 0.26 | | | 0.19 | | | | | | | 0.65 | 0.20 |
| 30 | | | | | 0.10 | | 0.0044 | | | | | 0.67 | 0.53 |
| 31 | | | 0.01 | | 0.03 | | 0.0067 | | | | | 0.57 | 0.74 |
| 32 | | 0.21 | | | 0.09 | | 0.0071 | | 0.03 | | | 0.50 | 0.70 |
| 33 | | | | | 0.04 | | 0.0064 | | | | | 0.60 | 0.13 |
| 34 | | | | | 0.08 | | 0.0022 | | | | | 0.66 | 0.56 |
| 35 | | | | | | | | | | | | 0.87 | 0.90 |
| 36 | | 0.35 | 0.11 | | 0.05 | 0.073 | 0.0030 | | | | | 0.48 | 0.22 |
| 37 | | 0.45 | 0.01 | | 0.28 | 0.010 | 0.0082 | | | | | 0.50 | 0.90 |
| 38 | | | | | | | | | | | | 0.55 | 0.30 |
| 39 | | 0.19 | 0.31 | 0.02 | 0.24 | 0.074 | 0.0094 | | 0.03 | 0.02 | 0.0026 | 0.83 | 0.08 |
| 40 | | | 0.15 | | | | | | | | | 0.66 | 1.05 |
| 41 | | 0.23 | | | | | | | | | | 0.69 | 2.80 |
| 42 | | | | 0.02 | | | | | | | | 0.53 | 0.15 |
| 43 | | | 0.30 | | 0.25 | | 0.0006 | | | | | 0.73 | 0.03 |
| 44 | | | | | | | | | | 0.499 | 0.0002 | 0.97 | 0.27 |
| 45 | | 0.25 | | | | | | | | | | 0.53 | 0.72 |
| 46 | | 0.45 | 0.23 | | | | 0.0073 | | | | 0.0061 | 0.65 | 0.90 |
| 47 | | 0.45 | 0.4 | | 0.11 | | | | | | | 0.73 | 0.37 |
| 48 | | | 1.4 | | | 0.04 | | | | | | 0.85 | 0.66 |
| 49 | | | | 0.01 | | | | | | | | 0.66 | 0.25 |
| 50 | | | | 0.35 | | | 0.0050 | | | | | 0.63 | 0.53 |
| 51 | | | 0.4 | | 0.02 | | 0.0050 | | | 0.21 | | 0.68 | 0.76 |

TABLE 4B

| | | CHEMICAL COMPOSITION EXCLUDING FLUORIDES, OXIDES, CAO, CARBONATES, AND IRON POWDER (REMAINDER: FE AND IMPURITIES) | | | | | | | | | | | Mg + |
|---|---|---|---|---|---|---|---|---|---|---|---|---|---|
| NO. | CLASS | Cu | Cr | V | Ti | Nb | B | Bi | Mg | Ca | REM | Ceq | 10 × Al |
| 52 | EXAMPLES | | | | 0.24 | | | | | | | 0.58 | 0.80 |
| 53 | | | | | | | 0.010 | | | 0.22 | 0.0030 | 0.54 | 0.25 |
| 54 | | | 0.31 | | | | 0.074 | | 0.02 | | | 0.49 | 0.31 |
| 55 | | | | | | | 0.0020 | | | | | 0.66 | 0.82 |
| 56 | | | | 0.02 | 0.09 | | 0.0080 | | | | | 0.59 | 0.74 |
| 57 | | | | | | | | | 0.04 | | | 0.47 | 0.25 |
| 58 | | | | | | | | | 0.08 | | | 0.48 | 0.11 |
| 59 | | | 0.12 | | | | | | | 0.01 | | 0.51 | 0.82 |
| 60 | | | | | | | | | | 0.47 | | 0.57 | 0.05 |
| 61 | | | 0.30 | | | | | | | | 0.0002 | 0.82 | 0.77 |
| 62 | | | | | | | | | | | 0.0049 | 0.58 | 0.77 |

TABLE 4B-continued

| | | CHEMICAL COMPOSITION EXCLUDING FLUORIDES, OXIDES, CAO, CARBONATES, AND IRON POWDER (REMAINDER: FE AND IMPURITIES) | | | | | | | | | | Mg + |
|---|---|---|---|---|---|---|---|---|---|---|---|---|
| NO. | CLASS | Cu | Cr | V | Ti | Nb | B | Bi | Mg | Ca | REM | Ceq | 10 × Al |
| 63 | COMPARATIVE | | | | 0.14 | | | | | | | 0.77 | 0.67 |
| 64 | EXAMPLES | | | | | | | | | | | 0.55 | 0.46 |
| 65 | | | | | | | 0.0025 | | | | | 0.60 | 0.78 |
| 66 | | | | | 0.11 | | | | | | | 0.62 | 0.77 |
| 67 | | | | | | | | | | | | 0.65 | 0.07 |
| 68 | | | | | | | 0.0031 | | | | | 0.72 | 0.25 |
| 69 | | | | | | | | | | | | 0.65 | 0.09 |
| 70 | | | | | 0.12 | | | | 0.32 | | | 0.67 | 1.22 |
| 71 | | | | | 0.17 | | | | | | | 0.69 | 0.28 |
| 72 | | | | | | | 0.0062 | | | | | 0.64 | 0.90 |
| 73 | | | | | | | 0.0036 | | | | | 0.57 | 0.77 |
| 74 | | 0.11 | | | | | | | | | | 0.55 | 0.20 |
| 75 | | | | | | | | | | 0.05 | | 0.69 | 0.84 |
| 76 | | | | | | | | | | | | 0.51 | 0.39 |
| 77 | | | | | | | | | | | | 0.71 | 0.38 |
| 78 | | | | | | | | | | | | 0.58 | 0.45 |
| 79 | | | 0.75 | | | | 0.0023 | | | | | 0.88 | 0.51 |
| 80 | | | | | | | 0.0042 | | | | | 0.46 | 0.76 |
| 81 | | | | | | | | | 0.06 | | 0.0006 | 0.98 | 0.70 |
| 82 | | | | | | | | | | | | 0.62 | 0.36 |
| 83 | | | | | | | | | | | | 0.46 | 0.22 |
| 84 | | | | | | | | | | | | 0.53 | 0.26 |
| 85 | | | | | | | | | | | | 0.71 | 0.06 |
| 86 | | | | | | | | | | | | 0.70 | 0.00 |
| 87 | | | | | | | | | | | | 0.63 | 3.80 |
| 88 | | | | | | | | | | | | 0.51 | 0.78 |
| 89 | | | | | | | | | | | | 1.04 | 0.14 |
| 90 | | 0.71 | | | | | | | | | | 0.76 | 0.30 |
| 91 | | | 2.25 | | | | | | | | | 1.07 | 0.07 |
| 92 | | | | 0.5 | | | | | | | | 0.67 | 0.20 |
| 93 | | | | | 0.51 | | | | | | | 0.73 | 0.51 |
| 94 | | | | | | 0.25 | | | | | | 0.58 | 0.98 |
| 95 | | | | | | | 0.0301 | | | | | 0.76 | 0.74 |
| 96 | | | | | | | | | 1.23 | | | 0.57 | 1.54 |
| 97 | | | | | | | | | | 0.61 | | 0.57 | 0.49 |
| 98 | | | | | | | | | | | 0.0300 | 0.57 | 0.36 |
| 99 | | | | | | | | | | | | 0.37 | 0.28 |
| 100 | | | 1.32 | 0.06 | | 0.07 | | | | | | 1.25 | 0.37 |

Using the flux-cored wires, the parent material of SM490A of JIS G 3106, in which the sheet thickness is 20 mm, was caused to abut with a root gap of 16 mm at a groove angle of 20°. Using a backing strip which is the same as the parent material, a welding was performed under the welding condition in which flow rate of 100% $CO_2$ gas is 25 L/min, welding current is 270 A, welding voltage is 30 V, and welding rate is 30 cm/min. Buttering of two layer, in which banking height is 3 mm or greater was performed to groove face of the parent material and the surface of the backing strip, using the flux-cored wire for test. In all welding, welding current was direct current, and wire polarity was positive.

In addition, the flux-cored wires 33, 42, 75, and 84 were coated with PFPE oil. On the other hand, other flux-cored wires were not coated with PFPE oil. In evaluation of the flux-cored wires 14, 29, 76, and 95, mixed gas of 20% $CO_2$ and 80% Ar was used as shielding gas, under the above-described welding condition. In evaluation of other flux-cored wires, 100% $CO_2$ was used as shielding gas. The flux-cored wires 24, 32, 73, and 81 were flux-cored wires with slit-shaped gap which were manufactured by caulking the sheath. Other flux-cored wires were seamless wires in which slit-shaped gaps were welded.

Figure 8:
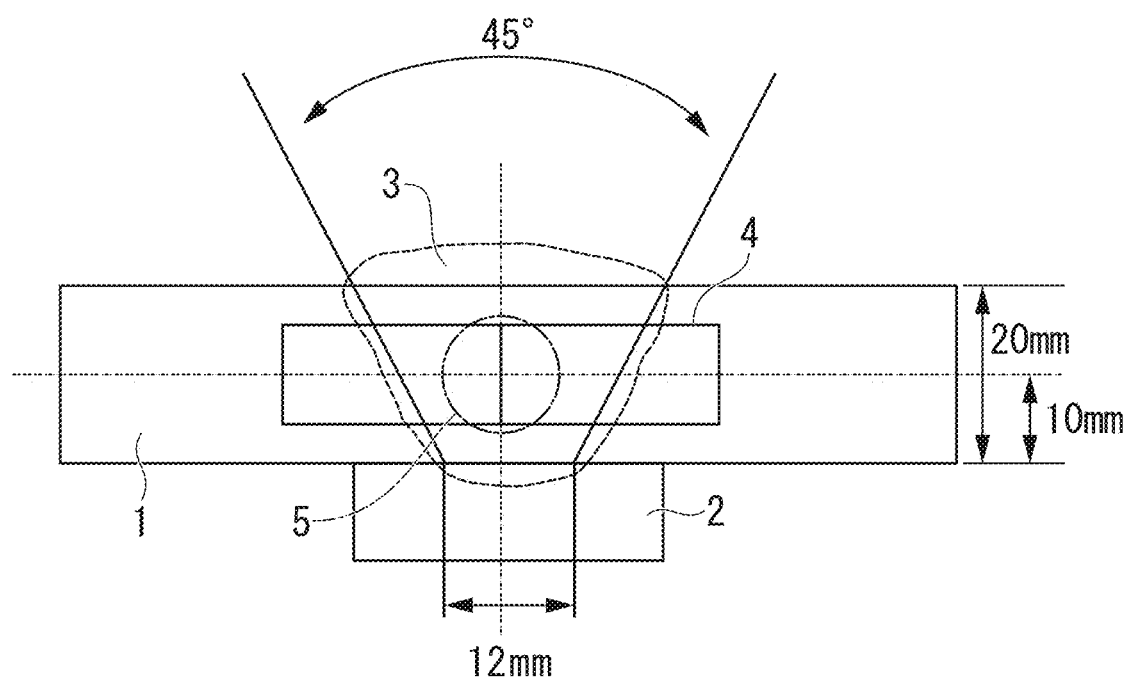
FIG. 8 is a view illustrating positions where Charpy impact test pieces (V-notch of 2 mm) and round bar tensile test pieces are collected.

No. A1 tensile test pieces (round bar) (diameter of 12.5 mm) and No. 4 Charpy test pieces (V-notch test pieces) in conformity to JIS Z 3111-2005 (method for tensile test and impact test of deposited metal) were collected from the obtained weld metal. FIG. 8 is a view illustrating positions where the test pieces were collected, in which the backing strip 2 was disposed on the steel sheet 1 to be welded, the weld bead 3 was formed, and Charpy impact test pieces 4 (V-notch of 2 mm) and round bar tensile test pieces 5 were collected. Using these test pieces, mechanical property test was performed, and thereby tensile strength of the deposited metal and Charpy absorbed energy were measured. Buttering was performed to groove face and the surface of the backing strip. Tables 5 and 6 show the result of the mechanical property test. The flux-cored wire that could make a weld metal having tensile strength of 710 MPa or higher and Charpy absorbed energy of 55 J or higher was accepted in regard to the mechanical property test. Test condition in the Charpy impact test was as below.

Shape of test piece: No. 4 Charpy test pieces (V-notch of 2 mm)

Temperature in test: −40° C.

Cold-cracking resistant test, and test for measuring the amount of diffusion hydrogen were performed under condition: 100% $CO_2$ gas (flow rate of welding gas: 25 L/min); downward welding posture; welding current 270 A; welding voltage 30V; welding rate 30 cm/min. The cold-cracking resistant test was carried out in conformity to JIS Z 3158 (method for the y-groove weld cracking test, 1993), using the high tensile steel sheet for weld structure, which has sheet thickness of 25 mm and is indicated in Table 7. In addition, the cold-cracking resistant test was carried out in conformity to JIS Z 3157 (method for the U-groove weld cracking test) in the constant atmosphere in which temperature is 5° C. and humidity is 60% without performing preheating. The flux-cored wires having no crack on a surface and a cross section were accepted.

The test of measuring the amount of diffusion hydrogen was carried out by the method of gas chromatography in conformity to JIS Z 3118 (method of measurement of amount of hydrogen evolved from steel welds, 2007), under the above-described welding condition for the cold-cracking resistant test.

Tables 5 and 6 indicate the results of the y-groove weld cracking test and the U-groove weld cracking test. In the weld metals in which diffusion hydrogen was less than 1.0 ml/100 g, no crack occurred in all cross sections of test pieces without preheating under a low temperature condition of ° C. Therefore, extremely excellent cold-cracking resistance was proved.

Evaluation of the amount of spatter was performed by the following method. Firstly, flux-cored wires were weld under the conditions as below.
Type of welding gas: 100% $CO_2$ gas
Flow rate of welding gas: 25 L/min
Welding current: 270 A
Welding voltage: 29 to 32 V
Welding rate: 30 cm/min
Welding posture: downward
Welding time: 60 seconds
Polarity: wire+(positive)

Bead-on-plate welding was carried out inside a copper scavenging case under the above-described conditions. All of spatters scattered in the case during welding and adhered to the steel sheet were scavenged, and the weight of the all spatters was measured, and the generation amount of spatter per unit time was calculated. The flux-cored wire in which the amount of spatter of became less than 5.0 g/min was accepted. The results are indicated in Tables 5 and 6.

Evaluation of welding workability was performed based on states of fume and arc. When performing the welding for evaluation of the amount of spatter, a remarkable generation of fume and a remarkable instability of arc were determined to be poor in regard to welding workability. When a few fume generated and arc became stable, welding workability was determined to be favorable. The results are indicated in Tables 5 and 6.

As indicated in Tables 5 and 6, in the weld metals obtained by flux-cored wires 1 to 62 which correspond to "Examples", tensile strength, toughness, and cold-cracking resistance were excellent and accepted. In addition, welding workability when using the flux-cored wires which correspond to "Examples" was favorable. On the other hand, in flux-cored wires 63 to 100 which correspond to "Comparative Examples", at least one of tensile strength, toughness, cold-cracking resistance, and welding workability was determined to be poor, since flux-cored wires 63 to 100 did not satisfy the factors regulated in the present invention.

TABLE 5

| NO. | CLASS | TENSILE STRENGTH [MPa] | CHARPY ABSORBED ENERGY [J] | y-GROOVE WELD CRACKING TEST | U-GROOVE WELD CRACKING TEST | AMOUNT OF DIFFUSION HYDROGEN [ml/100 g] | TOTAL AMOUNT OF SPATTER [g/min] | WELDING WORKABILITY |
|---|---|---|---|---|---|---|---|---|
| 1 | EXAMPLES | 711 | 89 | ACCEPTED | ACCEPTED | 0.8 | 0.7 | FAVORABLE |
| 2 | | 853 | 77 | ACCEPTED | ACCEPTED | 0.2 | 3.9 | FAVORABLE |
| 3 | | 743 | 82 | ACCEPTED | ACCEPTED | 0.7 | 0.9 | FAVORABLE |
| 4 | | 789 | 83 | ACCEPTED | ACCEPTED | 0.4 | 3.7 | FAVORABLE |
| 5 | | 869 | 73 | ACCEPTED | ACCEPTED | 0.6 | 1.2 | FAVORABLE |
| 6 | | 774 | 69 | ACCEPTED | ACCEPTED | 0.2 | 3.1 | FAVORABLE |
| 7 | | 751 | 83 | ACCEPTED | ACCEPTED | 0.7 | 1.3 | FAVORABLE |
| 8 | | 719 | 91 | ACCEPTED | ACCEPTED | 0.3 | 2.3 | FAVORABLE |
| 9 | | 832 | 99 | ACCEPTED | ACCEPTED | 0.6 | 1.1 | FAVORABLE |
| 10 | | 839 | 87 | ACCEPTED | ACCEPTED | 0.4 | 3.6 | FAVORABLE |
| 11 | | 799 | 71 | ACCEPTED | ACCEPTED | 0.7 | 1.1 | FAVORABLE |
| 12 | | 823 | 78 | ACCEPTED | ACCEPTED | 0.3 | 2.4 | FAVORABLE |
| 13 | | 795 | 83 | ACCEPTED | ACCEPTED | 0.6 | 0.9 | FAVORABLE |
| 14 | | 849 | 75 | ACCEPTED | ACCEPTED | 0.4 | 2.5 | FAVORABLE |
| 15 | | 846 | 91 | ACCEPTED | ACCEPTED | 0.3 | 3.1 | FAVORABLE |
| 16 | | 823 | 83 | ACCEPTED | ACCEPTED | 0.2 | 3.3 | FAVORABLE |
| 17 | | 866 | 87 | ACCEPTED | ACCEPTED | 0.3 | 3.6 | FAVORABLE |
| 18 | | 769 | 82 | ACCEPTED | ACCEPTED | 0.4 | 3.8 | FAVORABLE |
| 19 | | 774 | 86 | ACCEPTED | ACCEPTED | 0.4 | 2.4 | FAVORABLE |
| 20 | | 875 | 90 | ACCEPTED | ACCEPTED | 0.3 | 4.1 | FAVORABLE |
| 21 | | 880 | 71 | ACCEPTED | ACCEPTED | 0.2 | 2.3 | FAVORABLE |
| 22 | | 714 | 77 | ACCEPTED | ACCEPTED | 0.2 | 2.8 | FAVORABLE |
| 23 | | 773 | 91 | ACCEPTED | ACCEPTED | 0.4 | 2.7 | FAVORABLE |
| 24 | | 889 | 84 | ACCEPTED | ACCEPTED | 0.3 | 2.3 | FAVORABLE |
| 25 | | 710 | 102 | ACCEPTED | ACCEPTED | 0.4 | 3.7 | FAVORABLE |
| 26 | | 814 | 77 | ACCEPTED | ACCEPTED | 0.3 | 2.2 | FAVORABLE |
| 27 | | 864 | 76 | ACCEPTED | ACCEPTED | 0.3 | 2.4 | FAVORABLE |
| 28 | | 855 | 84 | ACCEPTED | ACCEPTED | 0.4 | 2.3 | FAVORABLE |
| 29 | | 839 | 86 | ACCEPTED | ACCEPTED | 0.4 | 2.1 | FAVORABLE |
| 30 | | 799 | 93 | ACCEPTED | ACCEPTED | 0.8 | 1.2 | FAVORABLE |
| 31 | | 746 | 109 | ACCEPTED | ACCEPTED | 0.3 | 2.4 | FAVORABLE |
| 32 | | 821 | 83 | ACCEPTED | ACCEPTED | 0.4 | 1.6 | FAVORABLE |
| 33 | | 862 | 87 | ACCEPTED | ACCEPTED | 0.4 | 2.5 | FAVORABLE |
| 34 | | 896 | 89 | ACCEPTED | ACCEPTED | 0.3 | 2.2 | FAVORABLE |
| 35 | | 913 | 88 | ACCEPTED | ACCEPTED | 0.7 | 1.3 | FAVORABLE |
| 36 | | 792 | 90 | ACCEPTED | ACCEPTED | 0.3 | 2.1 | FAVORABLE |
| 37 | | 813 | 86 | ACCEPTED | ACCEPTED | 0.2 | 2.8 | FAVORABLE |

TABLE 5-continued

| NO. | CLASS | TENSILE STRENGTH [MPa] | CHARPY ABSORBED ENERGY [J] | y-GROOVE WELD CRACKING TEST | U-GROOVE WELD CRACKING TEST | AMOUNT OF DIFFUSION HYDROGEN [ml/100 g] | TOTAL AMOUNT OF SPATTER [g/min] | WELDING WORKABILITY |
|---|---|---|---|---|---|---|---|---|
| 38 | | 866 | 83 | ACCEPTED | ACCEPTED | 0.3 | 2.9 | FAVORABLE |
| 39 | | 842 | 79 | ACCEPTED | ACCEPTED | 0.2 | 3.2 | FAVORABLE |
| 40 | | 820 | 94 | ACCEPTED | ACCEPTED | 0.4 | 3.1 | FAVORABLE |
| 41 | | 887 | 76 | ACCEPTED | ACCEPTED | 0.5 | 2.9 | FAVORABLE |
| 42 | | 848 | 86 | ACCEPTED | ACCEPTED | 0.3 | 3.2 | FAVORABLE |
| 43 | | 861 | 83 | ACCEPTED | ACCEPTED | 0.2 | 1.7 | FAVORABLE |
| 44 | | 885 | 81 | ACCEPTED | ACCEPTED | 0.5 | 1.8 | FAVORABLE |
| 45 | | 799 | 97 | ACCEPTED | ACCEPTED | 0.3 | 1.4 | FAVORABLE |
| 46 | | 811 | 93 | ACCEPTED | ACCEPTED | 0.3 | 1.5 | FAVORABLE |
| 47 | | 897 | 78 | ACCEPTED | ACCEPTED | 0.4 | 2.7 | FAVORABLE |
| 48 | | 907 | 72 | ACCEPTED | ACCEPTED | 0.3 | 2.1 | FAVORABLE |
| 49 | | 823 | 90 | ACCEPTED | ACCEPTED | 0.3 | 1.5 | FAVORABLE |
| 50 | | 866 | 93 | ACCEPTED | ACCEPTED | 0.3 | 3.4 | FAVORABLE |
| 51 | | 835 | 89 | ACCEPTED | ACCEPTED | 0.2 | 2.0 | FAVORABLE |

TABLE 6

| NO. | CLASS | TENSILE STRENGTH [MPa] | CHARPY ABSORBED ENERGY [J] | y-GROOVE WELD CRACKING TEST | U-GROOVE WELD CRACKING TEST | AMOUNT OF DIFFUSION HYDROGEN [ml/100 g] | TOTAL AMOUNT OF SPATTER [g/min] | WELDING WORKABILITY |
|---|---|---|---|---|---|---|---|---|
| 52 | EXAMPLES | 816 | 86 | ACCEPTED | ACCEPTED | 0.4 | 3.7 | FAVORABLE |
| 53 | | 832 | 83 | ACCEPTED | ACCEPTED | 0.3 | 4.2 | FAVORABLE |
| 54 | | 731 | 109 | ACCEPTED | ACCEPTED | 0.2 | 3.9 | FAVORABLE |
| 55 | | 839 | 87 | ACCEPTED | ACCEPTED | 0.2 | 2.1 | FAVORABLE |
| 56 | | 846 | 83 | ACCEPTED | ACCEPTED | 0.2 | 1.7 | FAVORABLE |
| 57 | | 823 | 65 | ACCEPTED | ACCEPTED | 0.1 | 2.4 | FAVORABLE |
| 58 | | 991 | 56 | ACCEPTED | ACCEPTED | 0.2 | 3.1 | FAVORABLE |
| 59 | | 822 | 81 | ACCEPTED | ACCEPTED | 0.3 | 1.6 | FAVORABLE |
| 60 | | 812 | 87 | ACCEPTED | ACCEPTED | 0.3 | 2.8 | FAVORABLE |
| 61 | | 839 | 78 | ACCEPTED | ACCEPTED | 0.2 | 2.9 | FAVORABLE |
| 62 | | 923 | 72 | ACCEPTED | ACCEPTED | 0.3 | 2.4 | FAVORABLE |
| 63 | COMPARATIVE | 884 | 81 | ACCEPTED | ACCEPTED | 0.3 | 10.9 | FAVORABLE |
| 64 | EXAMPLES | 830 | 82 | FAILED | FAILED | 2.0 | 1.1 | FAVORABLE |
| 65 | | 814 | 91 | ACCEPTED | ACCEPTED | 0.2 | 5.8 | FAVORABLE |
| 66 | | 832 | 83 | FAILED | FAILED | 2.5 | 1.2 | FAVORABLE |
| 67 | | 847 | 82 | ACCEPTED | ACCEPTED | 0.2 | 9.4 | FAVORABLE |
| 68 | | 912 | 74 | FAILED | FAILED | 2.8 | 0.7 | FAVORABLE |
| 69 | | 866 | 83 | ACCEPTED | ACCEPTED | 0.3 | 6.7 | FAVORABLE |
| 70 | | 835 | 82 | FAILED | FAILED | 1.3 | 0.9 | FAVORABLE |
| 71 | | 869 | 86 | ACCEPTED | ACCEPTED | 0.3 | 8.8 | FAVORABLE |
| 72 | | 832 | 82 | ACCEPTED | ACCEPTED | 0.3 | 1.7 | POOR |
| 73 | | 822 | 51 | ACCEPTED | ACCEPTED | 0.4 | 2.1 | FAVORABLE |
| 74 | | 834 | 48 | ACCEPTED | ACCEPTED | 0.3 | 1.8 | FAVORABLE |
| 75 | | 861 | 83 | ACCEPTED | ACCEPTED | 0.3 | 4.8 | POOR |
| 76 | | 821 | 77 | ACCEPTED | ACCEPTED | 0.2 | 3.3 | POOR |
| 77 | | 1029 | 16 | ACCEPTED | ACCEPTED | 0.4 | 3.2 | FAVORABLE |
| 78 | | 881 | 18 | ACCEPTED | ACCEPTED | 0.4 | 2.2 | FAVORABLE |
| 79 | | 722 | 38 | ACCEPTED | ACCEPTED | 0.4 | 2.8 | FAVORABLE |
| 80 | | 897 | 19 | ACCEPTED | ACCEPTED | 0.5 | 1.8 | FAVORABLE |
| 81 | | 834 | 13 | ACCEPTED | ACCEPTED | 0.3 | 3.1 | FAVORABLE |
| 82 | | 723 | 39 | ACCEPTED | ACCEPTED | 0.3 | 2.0 | FAVORABLE |
| 83 | | 814 | 19 | ACCEPTED | ACCEPTED | 0.5 | 2.1 | FAVORABLE |
| 84 | | 879 | 18 | ACCEPTED | ACCEPTED | 0.4 | 1.9 | FAVORABLE |
| 85 | | 749 | 31 | ACCEPTED | ACCEPTED | 0.3 | 3.2 | FAVORABLE |
| 86 | | 798 | 20 | ACCEPTED | ACCEPTED | 0.4 | 2.1 | FAVORABLE |
| 87 | | 890 | 17 | ACCEPTED | ACCEPTED | 0.3 | 1.8 | FAVORABLE |
| 88 | | 777 | 32 | ACCEPTED | ACCEPTED | 0.4 | 2.2 | FAVORABLE |
| 89 | | 1069 | 14 | ACCEPTED | ACCEPTED | 0.5 | 3.6 | FAVORABLE |
| 90 | | 890 | 17 | ACCEPTED | ACCEPTED | 0.4 | 2.0 | FAVORABLE |
| 91 | | 1069 | 14 | ACCEPTED | ACCEPTED | 0.4 | 2.1 | FAVORABLE |
| 92 | | 913 | 19 | ACCEPTED | ACCEPTED | 0.2 | 3.1 | FAVORABLE |
| 93 | | 787 | 14 | ACCEPTED | ACCEPTED | 0.2 | 2.9 | FAVORABLE |
| 94 | | 824 | 13 | ACCEPTED | ACCEPTED | 0.2 | 1.8 | FAVORABLE |
| 95 | | 881 | 16 | ACCEPTED | ACCEPTED | 0.4 | 3.9 | FAVORABLE |
| 96 | | 811 | 107 | FAILED | FAILED | 2.0 | 2.0 | FAVORABLE |

TABLE 6-continued

| NO. | CLASS | TENSILE STRENGTH [MPa] | CHARPY ABSORBED ENERGY [J] | y-GROOVE WELD CRACKING TEST | U-GROOVE WELD CRACKING TEST | AMOUNT OF DIFFUSION HYDROGEN [ml/100 g] | TOTAL AMOUNT OF SPATTER [g/min] | WELDING WORKABILITY |
|---|---|---|---|---|---|---|---|---|
| 97 | | 811 | 32 | ACCEPTED | ACCEPTED | 0.4 | 2.9 | FAVORABLE |
| 98 | | 843 | 14 | ACCEPTED | ACCEPTED | 0.4 | 2.0 | FAVORABLE |
| 99 | | 641 | 106 | ACCEPTED | ACCEPTED | 0.3 | 1.9 | FAVORABLE |
| 100 | | 1088 | 16 | ACCEPTED | ACCEPTED | 0.4 | 2.0 | FAVORABLE |

TABLE 7

| STEEL MATERIAL | SHEET THICKNESS [mm] | COMPOSITION OF STEEL MATERIAL [MASS %] | | | | | | | | | TENSILE STRENGTH [MPa] |
|---|---|---|---|---|---|---|---|---|---|---|---|
| | | C | Si | Mn | P | S | Cu | Ni | Cr | Mo | |
| STEEL SHEET OF 780 MPa CLASS | 50 | 0.13 | 0.25 | 1.16 | 0.0008 | 0.0001 | 0.23 | 0.96 | 0.64 | 0.43 | 931 |

In addition, the y-groove weld cracking test and the U-groove weld cracking test as well as the cold-cracking resistant test were performed, using a steel sheet in which Pcm is 0.30% and sheet thickness is 12 mm, a steel sheet in which Pcm is 0.29% and sheet thickness is 25 mm, a steel sheet in which Pcm is 0.28% and sheet thickness is 40 mm, and a steel sheet in which Pcm is 0.27% and sheet thickness is 100 mm, under the condition which is the same as the cold-cracking resistant test, without preheating, at temperature of 5° C. and humidity of 60%.

INDUSTRIAL APPLICABILITY

A flux-cored wire according to the present invention can obtain a weld which has high strength and high toughness, excellent cold-cracking resistance, and a favorable bead shape. The generation amount of spatter during welding can be drastically reduced. A welding method according to the present invention can omit preheating work for preventing a cold crack of a weld metal or can lower the preheating temperature during preheating work, and can drastically reduce the generation amount of spatter. A welded joint according to the present invention includes a weld having high strength, high toughness, and a favorable bead shape. Particularly, according to the present invention, even in a case where high strength steel of 780 MPa or higher is welded, preheating work for preventing a cold crack can be omitted or the preheating temperature during preheating work can be lowered. In addition, according to the present invention, even in a case where a shielding gas is 100% $CO_2$ gas, the generation amount spatter can be reduced. Therefore, welding efficiency can be remarkably improved by the present invention, and the value in the industry is extremely high.

BRIEF DESCRIPTION OF THE REFERENCE SYMBOLS 1 steel sheet
2 backing strip
3 weld bead
4 Charpy impact test pieces (V-notch of 2 mm)
5 round bar tensile test pieces
6 gap

The invention claimed is:

1. A flux-cored wire comprising:
a steel sheath; and
a flux that fills the steel sheath,
wherein the flux contains:
fluorides which include one or at least two selected from the group consisting of $CaF_2$, $MgF_2$, $Na_3AlF_6$, $LiF$, $NaF$, $K_2ZrF_6$, $BaF_2$, and $K_2SiF_6$, and of which a total value α of F-equivalent values is 0.21% or more with respect to a total mass of the flux-cored wire;
oxides which include one or at least two selected from the group consisting of Fe oxides, Ba oxides, Na oxides, Ti oxides, Si oxides, Zr oxides, Mg oxides, Al oxides, Mn oxides, and K oxides, while excluding CaO, and of which a total value β of amounts ranges from 0.30% to less than 3.50% by mass % with respect to the total mass of the flux-cored wire; and
carbonates which include one or at least two selected from the group consisting of $MgCO_3$, $Na_2CO_3$, $LiCO_3$, $CaCO_3$, $K_2CO_3$, $BaCO_3$, $FeCO_3$ and $MnCO_3$, and of which a total value of amounts ranges from 0% to 3.50% by mass % with respect to the total mass of the flux-cored wire,
wherein an amount of the CaO in the flux ranges from 0% to less than 0.20% by mass % with respect to the total mass of the flux-cored wire,
wherein an amount of iron powder in the flux ranges from 0% to less than 10.0% by mass % with respect to the total mass of the flux-cored wire,
wherein a X-value calculated by using Expression 1 is 5.0 or less,
wherein the amount of the $CaF_2$ is less than 0.50% by mass % with respect to the total mass of the flux-cored wire,
wherein the amount of the Ti oxides ranges from 0.10% to less than 2,50% by mass % with respect to the total mass of the flux-cored wire,
wherein a total value of the amounts of the $MgCO_3$, the $Na_2CO_3$, and the $LiCO_3$ ranges from 0% to 3.00% by mass % with respect to the total mass of the flux-cored wire, wherein a chemical composition excluding the fluorides, the oxides, the CaO, the carbonates, and the iron powder includes, by mass % with respect to the total mass of the flux-cored wire,
C: 0.003% to 0.200%,
Si: 0.20% to 1.50%,
Mn: 1.00% to 3.50%,
Mg: 0.10% or less,
P: 0.070% or less,
S: 0.020% or less,
Al: 0.001% to 0.300%,
Ni: 0.50% to 4.00%,
Mo: 0.10% to 2.00%,
Cu: 0% to 0.50%,
Cr: 0% to 1.50%,
Nb: 0% to 0.10%,
V: 0% to 0.40%,
Ti: 0% to 0.30%,
B: 0% to 0.0100%,
Bi: 0% to 0.0100%,
Ca: 0% to 0.50%, and
REM: 0% to 0.0100%,
while having a remainder composed of iron and impurities, and
wherein Ceq calculated by using the following Expression 2 ranges from 0.45% to 1.20%, $$X=[NaF]+[MgF_2]+[Na_3AlF_6]+1.50\times([K_2SiF_6]+[K_2ZrF_6]+[LiF]+[BaF_2])+3.50\times([CaF_2]):$$ Expression 1 where, the chemical formulas with square brackets each indicate, by unit mass % with respect to the total mass of the flux-cored wire, the amount of the fluoride corresponding to each of the chemical formulas, $$Ceq=[C]+[Si]/24\pm[Mn]/6+[Ni]/40+[Cr]/5+[Mo]/4+[V]/14:$$ Expression 2 where, the element symbols with square brackets each express, by unit mass % with respect to the total mass of the flux-cored wire, the amount of the element corresponding to each of the element symbols included in the chemical composition excluding the fluorides, the oxides, the CaO, the carbonates, and the iron powder.

2. The flux-cored wire according to claim 1,
wherein the chemical composition excluding the fluorides, the oxides, the CaO, the carbonates, and the iron powder includes, by mass % with respect to the total mass of the flux-cored wire,
Mg: 0.07% or less.

3. The flux-cored wire according to claim 1,
wherein the chemical composition excluding the fluorides, the oxides, the CaO, the carbonates, and the iron powder satisfies Expression 3, $$([Mg]+10\times[Al])\leq 0.45:$$ Expression 3 where, the element symbols with square brackets each indicate, by unit mass % with respect to the total mass of the flux-cored wire, the amount of the element corresponding to each of the element symbols included in the chemical composition excluding the fluorides, the oxides, the CaO, the carbonates, and the iron powder.

4. The flux-cored wire according to claim 1,
wherein the total amount of the carbonates ranges from more than 0.30% to 3.50% by mass % with respect to the total mass of the flux-cored wire, and wherein the total amount of the $MgCO_3$, the $Na_2CO_3$, and the ranges from 0.30% to 3.00% by mass % with respect to the total mass of the flux-cored wire.

5. The flux-cored wire according to claim 1,
wherein the α is 0.50% or more.

6. The flux-cored wire according to claim 1,
wherein the X-value is 4.5% or less.

7. The flux-cored wire according to claim 1,
wherein the amount of the Ti oxides ranges from 0.10% to 1.80% by mass % with respect to the total mass of the flux-cored wire.

8. The flux-cored wire according to claim 1,
wherein the amount of the $CaF_2$ is 0.20% or less by mass % with respect to the total mass of the flux-cored wire.

9. The flux-cored wire according to claim 1,
wherein α/β ranges from 0.10 to 4.00.

10. The flux-cored wire according to claim 1,
wherein the total amount of $Na_3AlF_6$ and NaF by mass % with respect to the total mass of the flux-cored wire is 50% or more of the total amount of the fluorides by mass % with respect to the total mass of the flux-cored wire.

11. The flux-cored wire according to claim 1,
wherein tensile strength of a deposited metal which is formed by a gas shield arc welding using the flux-cored wire ranges from 690 MPa to less than 1500 MPa in a tensile test of the deposited metal.

12. The flux-cored wire according to claim 1,
wherein the steel sheath has a seamless shape.

13. The flux-cored wire according to claim 1, wherein the steel sheath has a slit-shaped gap.

14. The flux-cored wire according to claim 1, further comprising
perfluoropolyether oil that coats a surface of the flux-cored wire.

15. A manufacturing method of a welded joint, comprising:
performing gas shield arc welding of a steel material by using the flux-cored wire according to claim 1.

16. The flux-cored wire according to claim 2,
wherein the chemical composition excluding the fluorides, the oxides, the CaO, the carbonates, and the iron powder satisfies Expression 3, $$([Mg]+10\times[Al])\leq 0.45:$$ Expression 3 where, the element symbols with square brackets each indicate, by unit mass % with respect to the total mass of the flux-cored wire, the amount of the element corresponding to each of the element symbols included in the chemical composition excluding the fluorides, the oxides, the CaO, the carbonates, and the iron powder.

17. The manufacturing method of a welded joint according to claim 15,
wherein the steel material is one selected from the group consisting of:
a steel sheet in which a sheet thickness is 12 ram or less and Pcm is 0.36% or less;
a steel sheet in which a sheet thickness is more than 12 mm to 25 mm and Pcm is 0.33% or less;
a steel sheet in which a sheet thickness is more than 25 mm to 40 mm and Pcm is 0.31% or less; and
a steel sheet in which a sheet thickness is more than 40 mm to 100 mm and Pcm is 0.29% or less,
and wherein the gas shield arc welding is performed after the steel material is preheated such that the temperature of the steel material becomes 5° C. or higher in a case where the temperature of the steel material is less than 5° C. when the steel material is subjected to the gas shield arc welding; or the gas shield arc welding is performed without preheating the steel material in a case where the temperature of the steel material is 55° C. or higher when the steel material is subjected to the gas shield arc welding, where Pcm is calculated by using the following Expression 4, $$Pcm = [C] + [Si]/30 + [Mn]/20 + [Cu]/20 + [Ni]/60 + [Cr]/20 + [Mo]/15 + [V]/10 + 5 \times [B]: \quad \text{Expression 4}$$

where, the element symbols with square brackets each express, by unit mass %, the amount of the element corresponding to each of the element symbols included in the steel material.

18. A welded joint which is obtained by the manufacturing method of a welded joint according to claim 15.

\* \* \* \* \*